US007233364B2

(12) United States Patent
Kondo et al.

(10) Patent No.: US 7,233,364 B2
(45) Date of Patent: Jun. 19, 2007

(54) APPARATUS AND METHOD FOR GENERATING COEFFICIENT DATA, APPARATUS AND METHOD FOR PROCESSING INFORMATION SIGNAL USING THE SAME, APPARATUS AND METHOD FOR OBTAINING COEFFICIENT DATA USED THEREFOR, AND INFORMATION PROVIDING MEDIUM

(75) Inventors: Tetsujiro Kondo, Tokyo (JP); Takeshi Miyai, Kanagawa (JP); Katsuhisa Shinmei, Tokyo (JP); Gakuho Fukushi, Chiba (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 10/167,271

(22) Filed: Jun. 11, 2002

(65) Prior Publication Data
US 2003/0044087 A1 Mar. 6, 2003

(30) Foreign Application Priority Data
Jun. 12, 2001 (JP) .............................. 2001-177590

(51) Int. Cl.
*H04N 11/20* (2006.01)
(52) U.S. Cl. ...................... 348/458; 348/448; 348/581; 382/299
(58) Field of Classification Search ................ 348/441, 348/448, 458, 581; 358/3.06, 535; 382/298–300, 382/250–252, 237, 260; 712/16, 17; 708/300, 708/313, 308, 490, 514; 345/606, 609
See application file for complete search history.

(56) References Cited
U.S. PATENT DOCUMENTS

| 4,658,367 | A | * | 4/1987 | Potter | 702/111 |
| 5,307,425 | A | * | 4/1994 | Otsuka | 382/252 |
| 5,933,537 | A | * | 8/1999 | Hajjahmad et al. | 382/250 |
| 5,953,459 | A | * | 9/1999 | Ueda et al. | 382/237 |
| 6,125,199 | A | * | 9/2000 | Sato et al. | 382/162 |
| 6,292,433 | B1 | * | 9/2001 | Gilbert et al. | 367/138 |
| 6,798,897 | B1 | * | 9/2004 | Rosenberg | 382/107 |
| 2002/0131645 | A1 | * | 9/2002 | Hamilton | 382/251 |

* cited by examiner

*Primary Examiner*—Victor R. Kostak
(74) *Attorney, Agent, or Firm*—Frommer Lawrence & Haug LLP; William S. Frommer; Thomas F. Presson

(57) ABSTRACT

A class code of a subject pixel of an HD signal is obtained from pixel data of a class tap extracted from an SD signal. In a memory bank, coefficient data for a generating equation, including parameters for adjusting image quality, for generating elements of a summation matrix for obtaining coefficient data for an estimate equation are stored on a class basis. A summation matrix is generated in accordance with the coefficient data stored in the memory bank and the values of the parameters as specified by a user operation, generating coefficient data for the estimate equation for each class in accordance with the values of the parameters, which is stored in a memory. A calculation circuit calculates pixel data of the subject pixel of the HD signal by the estimate equation from pixel data of the prediction tap extracted from the SD signal and from coefficient data associated with the class code, supplied from the memory.

14 Claims, 12 Drawing Sheets

FIG. 3
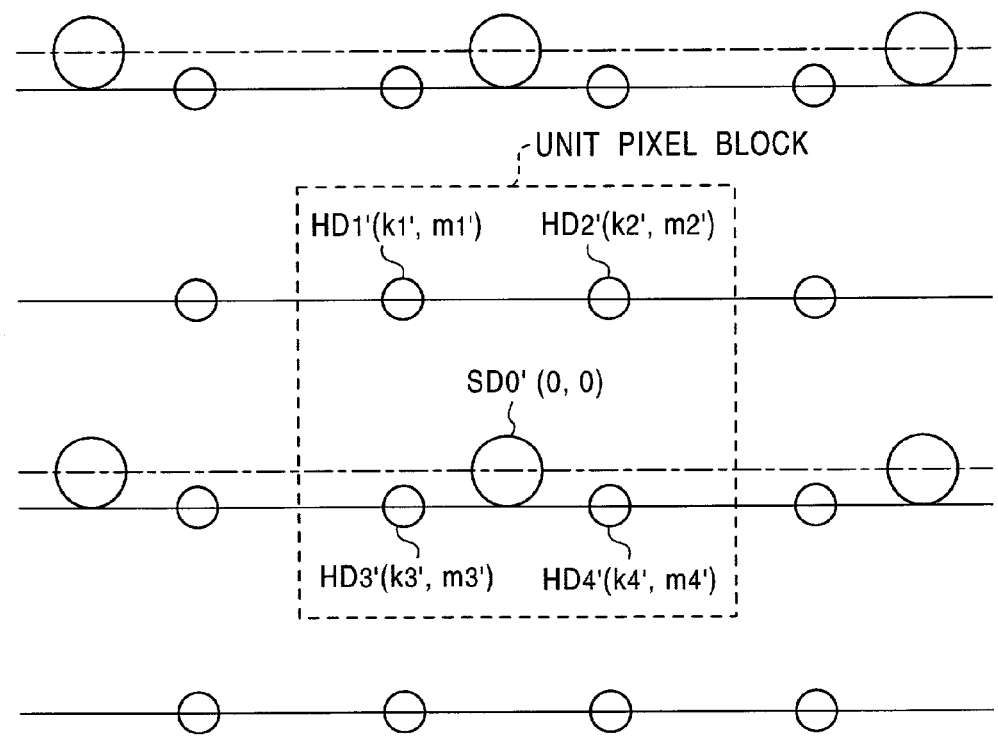
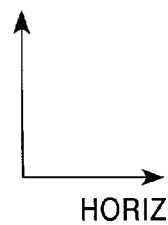
VERTICAL
HORIZONTAL
 SD (525i)
 HD (1050i)

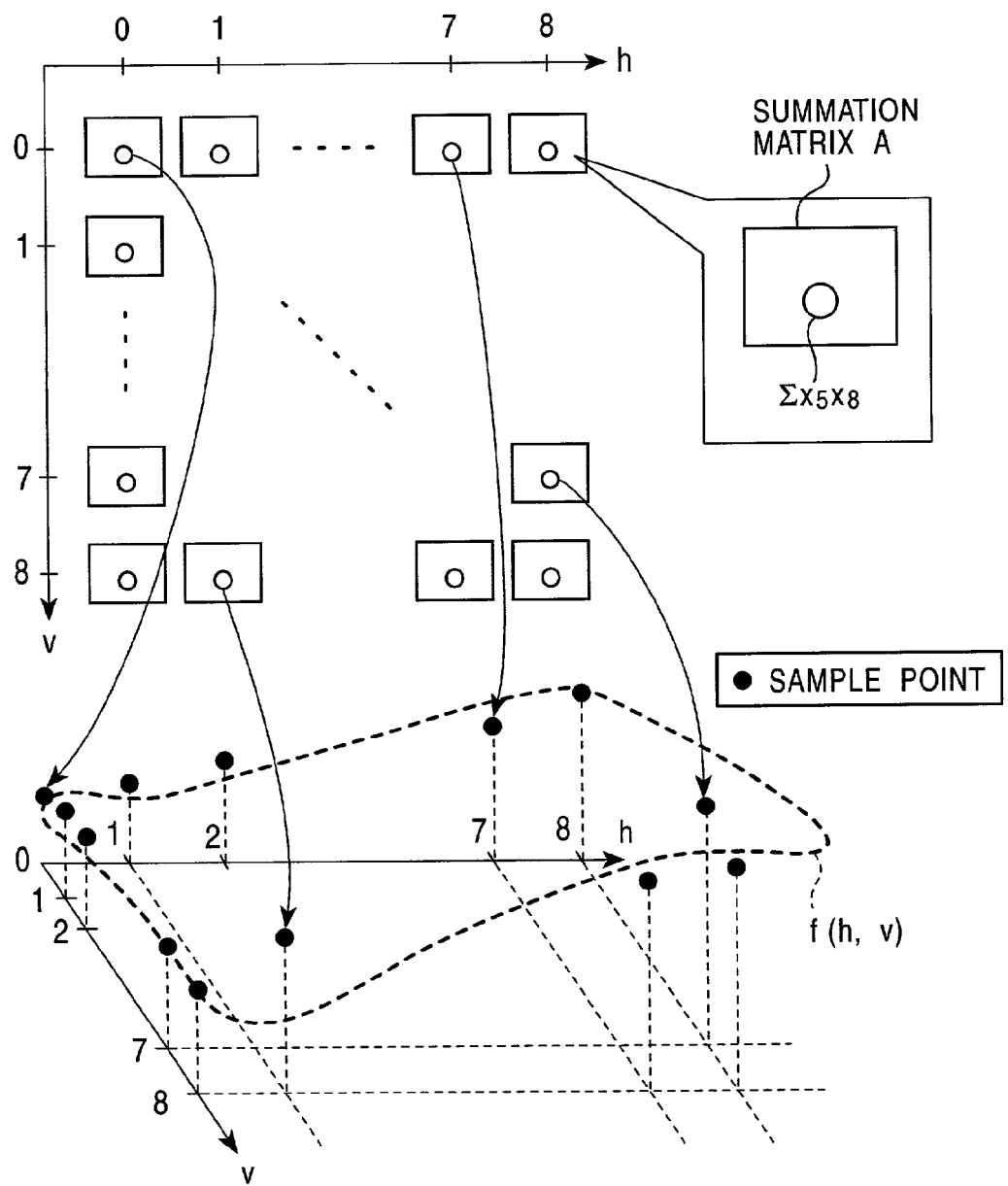

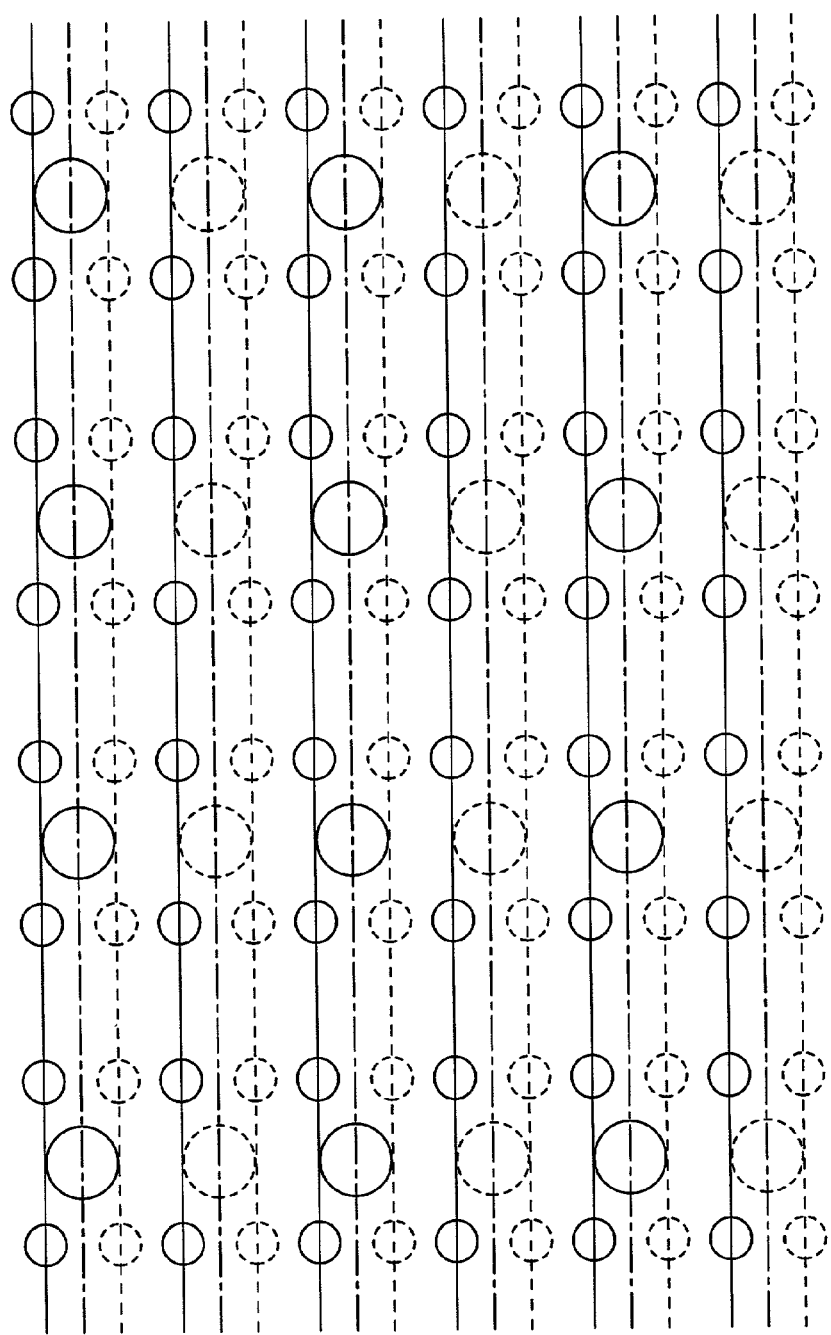
FIG. 12
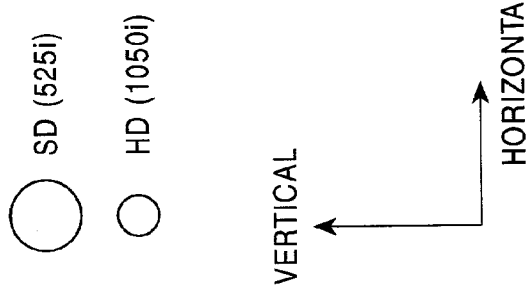

APPARATUS AND METHOD FOR GENERATING COEFFICIENT DATA, APPARATUS AND METHOD FOR PROCESSING INFORMATION SIGNAL USING THE SAME, APPARATUS AND METHOD FOR OBTAINING COEFFICIENT DATA USED THEREFOR, AND INFORMATION PROVIDING MEDIUM

BACKGROUND OF THE INVENTION

1. Field of the Invention

The present invention relates to an apparatus and method for generating coefficient data, an apparatus and method for processing an information signal using the same, an apparatus and method for obtaining coefficient data used therefor, and an information providing medium. More specifically, the present invention relates to a coefficient data generating apparatus, etc. in which coefficient data that is used when converting a first information signal into a second information signal is generated by generating elements of a summation matrix in accordance with the value of a predetermined parameter by a generating equation and using the summation matrix composed of the elements, so that the second information signal in accordance with the value of the predetermined parameter can be favorably obtained from the first information signal without incurring the need for a larger memory for storing coefficient data.

2. Description of the Related Art

Hitherto, conversion of signal format, for example, from an SD (Standard Definition) signal called 525i signal into an HD (High Definition) signal called 1050i signal, has been proposed. 525i signal refers to an interlaced image signal with a line count of 525, and 1050i signal refers to an interlaced image signal with a line count of 1,050.

FIG. 12 shows the relationship between pixel positions of a 525i signal and a 1050i signal, in which larger dots represent pixels of 525i signal and smaller dots represent pixels of 1050i signal. The positions of pixels in odd-numbered fields are shown in solid lines and the positions of pixels in even-numbered fields are shown in broken lines. When a 525i signal is converted into a 1050i signal, four pixels of 1050i signal must be obtained in association with one pixel of 525i signal in each of odd-numbered and even-numbered fields.

It has hitherto been proposed that, when obtaining pixel data of 1050i signal from pixel data of 525i signal in order to execute a format conversion as above, coefficient data for an estimate equation in accordance with phase of each of the pixels of 1050i signal corresponding to the pixel of 525i signal be stored in a memory so that pixel data of 1050i signal will be obtained by the estimate equation using the coefficient data.

In the technique of obtaining pixel data of 1050i signal by the estimate equation as described above, the resolution of an image based on the 1050i signal is fixed, not allowing the resolution to be changed as desired in accordance with the content of the image, etc. as has been the case for adjustment of contrast, sharpness, etc. It is possible to prepare coefficient data associated with a plurality of resolutions so that the user is allowed to adjust the resolution as desired; however, this incurs increased amount of memory being required to store the coefficient data, leading to increased cost of the apparatus.

SUMMARY OF THE INVENTION

Accordingly, it is an object of the present invention to provide a coefficient data generating apparatus, etc. in which a second information signal of an image quality in accordance with a value of a predetermined parameter can be favorably obtained without incurring the need for a larger memory for storing coefficient data.

To this end, the present invention, in one aspect thereof, provides a coefficient data generating apparatus that is used, when converting a first information signal composed of a plurality of information data into a second information signal composed of a plurality of information data, for generating coefficient data for an estimate equation for calculating information data of a subject point associated with the second information signal from a plurality of information data extracted from the first information signal. The coefficient data generating apparatus includes a storage unit for storing coefficient data for a generating equation, which includes a predetermined parameter, for generating elements of a summation matrix for obtaining coefficient data for the estimate equation; a parameter setting unit for setting a value of the predetermined parameter; a matrix element generating unit for generating the elements of the summation matrix by the generating equation based on the coefficient data stored in the storage unit, in accordance with the value of the predetermined parameter set by the parameter setting unit; and a coefficient data generating unit for generating coefficient data for the estimate equation using the summation matrix composed of the elements generated by the matrix element generating unit.

The predetermined parameter may determine, for example, quality of an output obtained from the second information signal.

Alternatively, the predetermined parameter may represent a phase of the subject point associated with the second information signal, with respect to the position of information data of the first information signal.

The present invention, in another aspect thereof, provides a coefficient data generating method that is used, when converting a first information signal composed of a plurality of information data into a second information signal composed of a plurality of information data, for generating coefficient data for an estimate equation for calculating information data of a subject point associated with the second information signal from a plurality of information data extracted from the first information signal. The coefficient data generating method includes a first step of setting a value of a predetermined parameter; a second step of generating elements of a summation matrix for obtaining coefficient data of the estimate equation, by a generating equation that includes the predetermined parameter, based on coefficient data of the generating equation and in accordance with the value of the predetermined parameter set in the first step; and a third step of generating coefficient data for the estimate equation using the summation matrix composed of the elements generated in the second step.

The present invention, in another aspect thereof, provides an information providing medium for providing a computer program that is used, when converting a first information signal composed of a plurality of information data into a second information signal composed of a plurality of information data, for generating coefficient data for an estimate equation for calculating information data of a subject point associated with the second information signal from a plurality of information data extracted from the first information signal. The computer program includes a first step of setting a value of a predetermined parameter; a second step of generating elements of a summation matrix for obtaining coefficient data of the estimate equation, by a generating equation including the predetermined parameter, based on coefficient data of the generating equation and in accordance with the value of the predetermined parameter set in the first step; and a third step of generating coefficient data for the estimate equation using the summation matrix composed of the elements generated in the second step.

The present invention, in another aspect thereof, provides an information signal processing apparatus for converting a first information signal composed of a plurality of information data into a second information signal composed of a plurality of information data. The information signal apparatus includes a storage unit for storing coefficient data for a generating equation, which includes a predetermined parameter, for generating elements of a summation matrix for obtaining coefficient data for an estimate equation; a parameter setting unit for setting a value of the predetermined parameter; a coefficient data generating unit for generating the elements of the summation matrix by the generating equation based on the coefficient data stored in the storage unit and in accordance with the value of the predetermined parameter set by the parameter setting unit, and for generating coefficient data for the estimate equation in accordance with the value of the predetermined parameter using the summation matrix composed of the elements; a first data selecting unit for selecting from the first information signal a plurality of first information data positioned around a subject point associated with the second information signal; and a calculation unit for calculating information data of the subject point using the estimate equation from the coefficient data for the estimate equation, generated by the coefficient data generating unit, and from the plurality of information data selected by the first data selecting unit.

The information signal processing apparatus may further include a second data selecting unit for selecting from the first information signal a plurality of second information data positioned around the subject point associated with the second information signal; and a class detecting unit for detecting a class to which the subject point belongs based on the plurality of second information data selected by the second data selecting unit; wherein the storage unit stores the coefficient data for each class that can be detected by the class detecting unit, and the coefficient data generating unit generates coefficient data for the estimate equation in accordance with the class detected by the class detecting unit and the value of the predetermined parameter set by the parameter setting unit.

The coefficient data generating unit may include a matrix element generating unit for generating elements of the summation matrix for each class based on the coefficient data stored in the storage unit; a storage unit for storing the coefficient data for the estimate equation for each class, generated by the coefficient generating unit; and a coefficient data reading unit for reading coefficient data of the estimate equation, associated with the class detected by the class detecting unit, from the storage unit and outputting the coefficient data that has been read.

The predetermined parameter may determine, for example, quality of an output obtained from the second information signal.

Alternatively, the predetermined parameter may represent a phase of the subject point associated with the second information signal, with respect to the position of information data of the first information signal.

The present invention, in another aspect thereof, provides an information signal processing method for converting a first information signal composed of a plurality of information data into a second information signal composed of a plurality of information data. The information signal method includes a first step of setting a value of a predetermined parameter; a second step of generating elements of a summation matrix for obtaining coefficient data of an estimate equation, by a generating equation that includes the predetermined parameter, based on coefficient data of the generating equation and in accordance with the value of the predetermined parameter set in the first step, and for generating coefficient data for the estimate equation in accordance with the value of the predetermined parameter using the summation matrix composed of the elements; a third step of selecting from the first information signal a plurality of first information data positioned around a subject point associated with the second information signal; and a fourth step of calculating information data of the subject point using the estimate equation from the coefficient data for the estimate equation, generated in the second step, and from the plurality of information data selected in the third step.

The present invention, in another aspect thereof, provides an information providing medium for providing a computer program for converting a first information signal composed of a plurality of information data into a second information signal composed of a plurality of information data. The computer program includes a first step of setting a value of a predetermined parameter; a second step of generating elements of a summation matrix for obtaining coefficient data of an estimate equation, by a generating equation that includes the predetermined parameter, based on coefficient data of the generating equation and in accordance with the value of the predetermined parameter set in the first step, and for generating coefficient data for the estimate equation in accordance with the value of the predetermined parameter using the summation matrix composed of the elements; a third step of selecting from the first information signal a plurality of first information data positioned around a subject point associated with the second information signal; and a fourth step of calculating information data of the subject point using the estimate equation from the coefficient data for the estimate equation, generated in the second step, and from the plurality of information data selected in the third step.

The present invention, in another aspect thereof, provides a coefficient data obtaining apparatus for obtaining coefficient data for a generating equation, which includes a predetermined parameter, for generating elements of a summation matrix for obtaining coefficient data for an estimate equation that is used when converting a first information signal composed of a plurality of information data into a second information signal composed of a plurality of information data. The coefficient data obtaining apparatus includes a data selecting unit for selecting from a student signal corresponding to the first information signal a plurality of information data positioned around a subject point associated with a teacher signal corresponding to the second information signal; a summation matrix generating unit for generating a summation matrix for obtaining coefficient data for the estimate equation in accordance with a plurality of discrete values of the predetermined parameter based on the plurality of information data selected by the data selecting unit and information data of the subject point associated with the teacher signal; and a coefficient data generating unit for generating coefficient data for a generating equation, which includes the predetermined parameter, for generating elements of the summation matrix, using elements of the summation matrix, generated by the summation matrix generating unit, respectively associated with the plurality of discrete values of the predetermined parameter.

The predetermined parameter may determine, for example, quality of an output obtained from the second information signal.

The predetermined parameter may represent a phase of the subject point associated with the second information signal, with respect to the position of information data of the first information signal.

The present invention, in another aspect thereof, provides a coefficient data obtaining method for obtaining coefficient data for a generating equation, which includes a predetermined parameter, for generating elements of a summation matrix for obtaining coefficient data for an estimate equation that is used when converting a first information signal composed of a plurality of information data into a second information signal composed of a plurality of information data. The coefficient data obtaining method includes a first step of selecting from a student signal corresponding to the first information signal a plurality of information data positioned around a subject point associated with a teacher signal corresponding to the second information signal; a second step of generating a summation matrix for obtaining coefficient data for the estimate equation in accordance with a plurality of discrete values of the predetermined parameter based on the plurality of information data selected in the first step and information data of the subject point associated with the teacher signal; and a third step of generating coefficient data for a generating equation, which includes the predetermined parameter, for generating elements of the summation matrix, using elements of the summation matrix, generated in the second step, respectively associated with the plurality of discrete values of the predetermined parameter.

The present invention, in another aspect thereof, provides an information providing medium for providing a computer program for obtaining coefficient data for a generating equation, which includes a predetermined parameter, for generating elements of a summation matrix for obtaining coefficient data for an estimate equation that is used when converting a first information signal composed of a plurality of information data into a second information signal composed of a plurality of information data. The computer program includes a first step of selecting from a student signal corresponding to the first information signal a plurality of information data positioned around a subject point associated with a teacher signal corresponding to the second information signal; a second step of generating a summation matrix for obtaining coefficient data for the estimate equation in accordance with a plurality of discrete values of the predetermined parameter based on the plurality of information data selected in the first step and information data of the subject point associated with the teacher signal; and a third step of generating coefficient data for a generating equation, which includes the predetermined parameter, for generating elements of the summation matrix, using elements of the summation matrix, generated in the second step, respectively associated with the plurality of discrete values of the predetermined parameter.

According to the present invention, coefficient data for an estimate equation that is used when converting a first information signal into a second information signal is generated by generating elements of a summation matrix in accordance with the value of a predetermined parameter by a generating equation and using the summation matrix composed of the elements. Accordingly, the second information signal in accordance with the value of the predetermined parameter can be favorably obtained from the first information signal.

Furthermore, according to the present invention, coefficient data for an estimate equation in accordance with the value of a predetermined parameter is obtained not by assigning the value of the predetermined parameter to a generating equation that directly approximates coefficient data of the estimate equation, but by assigning the value of the predetermined parameter to generating equations respectively approximating elements of a summation matrix for obtaining coefficient data of the estimate equation, which are highly dependent on change in the value of the predetermined parameter, generating the elements of the summation matrix, and solving the summation matrix.

BRIEF DESCRIPTION OF THE DRAWINGS

FIG. 3 is a diagram showing phase differences of four pixels in a unit pixel block in an even-numbered field of an HD signal (1050i signal) with respect to a center prediction tap;

FIG. 5 is a diagram showing the scheme of approximation of a curved surface for an element ($\Sigma x_5 x_8$) in a summation matrix for each resolution;

FIG. 12 is a diagram showing the relationship between pixel positions of a 525i signal and a 1050i signal.

DESCRIPTION OF THE PREFERRED EMBODIMENTS

Figure 1:
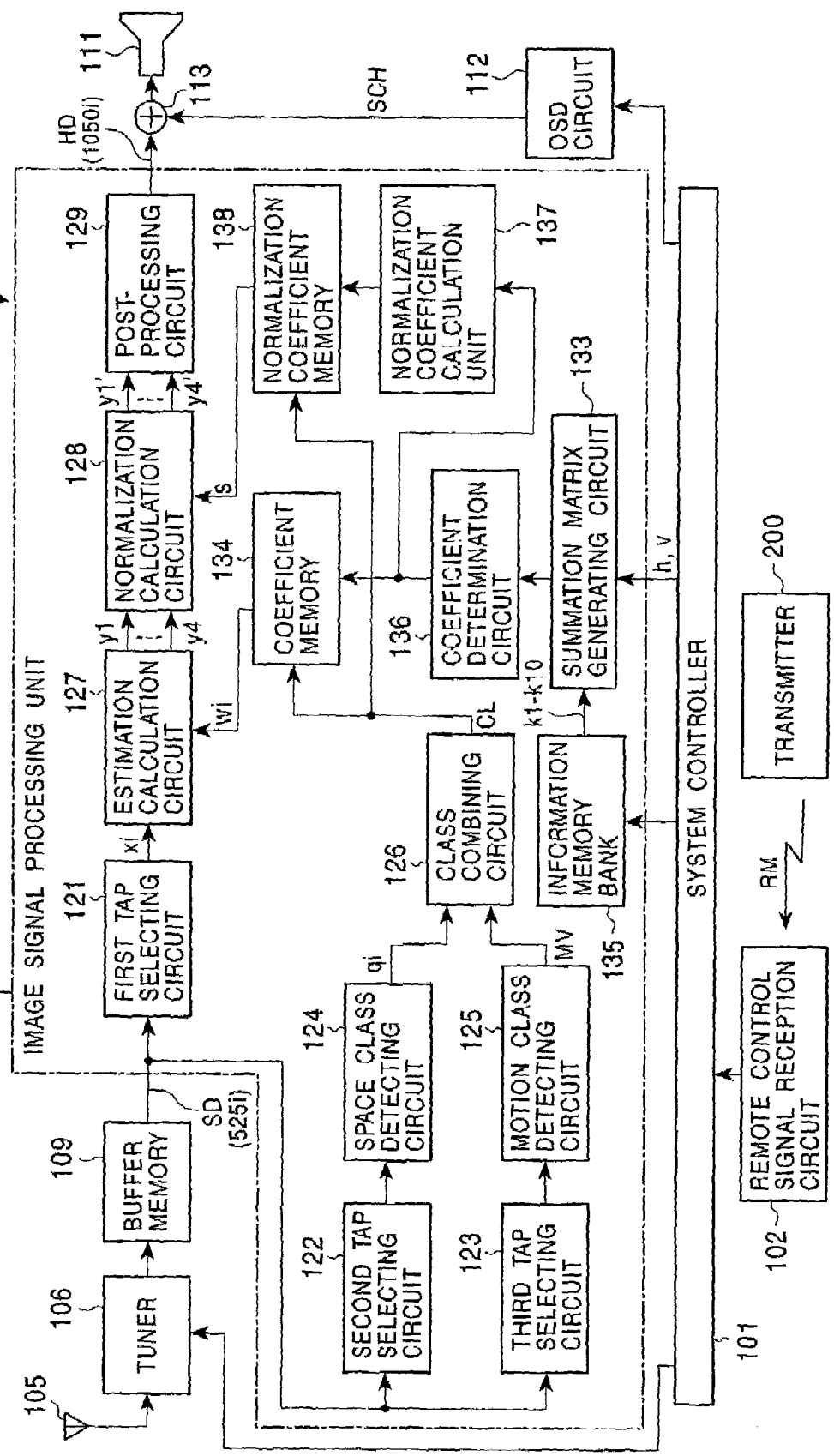
FIG. 1 is a block diagram showing the construction of a television receiver according to an embodiment of the present invention.

Preferred embodiments of the present invention will now be described with reference to the accompanying drawings. FIG. 1 shows the construction of a television receiver 100 according to an embodiment of the present invention. The television receiver 100 obtains an SD signal called 525i signal from a broadcasting signal, converts the 525i signal into an HD signal called 1050i signal, and displays an image based on the 1050i signal.

The television receiver 100 includes a system controller 101 incorporating a microcomputer, which controls the overall system operation, and a remote control signal reception circuit 102 for receiving a remote control signal. The remote control signal reception circuit 102 is connected to the system controller 101. The remote control signal reception circuit 102 receives a remote control signal RM output from a remote control transmitter 200 according to a user operation, and supplies an operation signal corresponding to the remote control signal RM to the system controller 101.

The television receiver 100 further includes a reception antenna 105, a tuner 106 to which a broadcasting signal (RF modulated signal) received by the reception antenna 105 is supplied, and which executes a channel selection process, an intermediate frequency amplification process, a detection process, etc. to obtain the SD signal (525i signal) described earlier, and a buffer memory 109 for temporarily storing the SD signal output from the tuner 106.

The television receiver 100 further includes an image signal processing unit 110 for converting the SD signal (525i signal) temporarily stored in the buffer memory 109 into an HD signal (1050i signal), a display unit 111 for displaying an image based on the HD signal output from the image signal processing unit 110, an OSD (On Screen Display) circuit 112 for generating a display signal SCH for displaying text or graphics on a screen of the display unit 111, and a combining unit 113 for combining the display signal SCH with the HD signal output from the image signal processing unit 110 described above and supplying the result to the display unit 111. The display unit 111 is implemented, for example, by a CRT (cathode-ray tube) display or a flat-panel display such as an LCD (liquid crystal display).

Now, the operation of the television receiver 100 shown in FIG. 1 will be described.

An SD signal (525i signal) output from the tuner 106 is supplied to and temporarily stored in the buffer memory 109. The SD signal temporarily stored in the buffer memory 109 is supplied to the image signal processing unit 110, where the SD signal is converted into an HD signal (1050i signal). That is, the image signal processing unit 110 yields pixel data constituting an HD signal (hereinafter referred to as "HD pixel data") from pixel data constituting an SD signal (hereinafter referred to as "SD pixel data"). The HD signal output from the image signal processing unit 110 is supplied to the display unit 111, so that an image based on the HD signal is displayed on a screen of the display unit 111.

A user is allowed to change horizontal and vertical resolutions of the image displayed on the screen of the display unit 111 as described above by operating the remote control transmitter 200. As will be described later, the image signal processing unit 110 calculates HD pixel data by an estimate equation, using data corresponding to the values of parameters h and v representing the horizontal and vertical resolutions, adjusted by the user operation of the remote control transmitter 200, as coefficient data for the estimate equation.

Thus, the horizontal and vertical resolutions of the image based on the HD signal output from the image signal processing unit 110 are in accordance with the adjusted values of the parameters h and v. The values of the parameters h and v are displayed on the screen of the display unit 111 when they are being adjusted. The user is allowed to adjust the values of the parameters h and v with reference to the display.

Now, the image signal processing unit 110 will be described in detail.

The image signal processing unit 110 includes first to third tap selecting circuit 121 to 123, which selectively extract data of a plurality of SD pixels positioned around subject pixels associated with an HD signal (1050i signal), from an SD signal (525i signal) stored in the buffer memory 109.

The first tap selecting circuit 121 selectively extracts data of SD pixels to be used for prediction (referred to as "prediction taps"). The second tap selecting circuit 122 selectively extracts data of SD pixels to be used for classification based on a distribution pattern of the levels of SD pixel data (referred to as "space class taps"). The third tap selecting circuit 123 selectively extracts data of SD pixels to be used for classification based on motion (referred to as "motion class taps"). If space class is determined using data of SD pixels that belong to a plurality of fields, space class also includes information regarding motion.

The image signal processing unit 110 further includes a space class detecting circuit 124, which detects a distribution pattern of the levels of space class tap data (SD pixel data) selectively extracted by the second tap selecting circuit 122, thereby detecting a space class based on the pattern of level distribution and outputting space class information.

The space class detecting circuit 124 executes an operation for compressing each SD pixel data, for example, from eight bits to two bits. The space class detecting circuit 124 thus outputs compressed data corresponding to each SD pixel data as space class information. In this embodiment, data is compressed based on ADRC (Adaptive Dynamic Range Coding). Alternatively to ADRC, data compression may be based on, for example, DPCM (Differential Pulse Code Modulation), VQ (Vector Quantization), etc.

ADRC is an adaptive re-quantization method originally developed for high-performance encoding for use in VTR (Video Tape Recorder); however, ADRC is also suitable for the type of data compression described above because it allows efficient representation of a local pattern of signal levels in a short code length. When ARDC is used, letting the maximum value of the data of space class taps (SD pixel data) be denoted as MAX, the minimum value thereof as MIN, the dynamic range of the data of space class taps as DR (=MAX−MIN+1), and the number of re-quantization bits as P, re-quantization codes qi that constitute compressed data are obtained respectively for the SD pixel data ki constituting the data of space class taps by equation (1) below, in which [ ] represents truncation. When the number of SD pixel data constituting the data of space class taps is Na, i=1 to Na.

$$qi=[(ki-\text{MIN}+0.5)*2^P/DR] \qquad (1)$$

The image signal processing unit 110 further includes a motion class detecting circuit 125, which detects a motion class, mainly representing degree of motion, from the data (SD pixel data) of motion class taps selectively extracted by the third tap selecting circuit 123, outputting motion class information.

The motion class detecting circuit 125 calculates the differences between frames from data (SD pixel data) mi (data of t-th frame) and ni (data of (t+1)-th frame) of motion class taps selectively extracted by the third tap selecting circuit 123, and a threshold operation is applied to the average of the absolute values of the differences, so that a motion class representing motion is detected. That is, the motion class detecting circuit 125 detects the average AV of the absolute values of the differences by equation (2) below. If the third tap selecting circuit 123 extracts, for example, twelve SD pixel data m1 to m6 and n1 to n6, Nb in equation (2) is six.

$$AV = \frac{\sum_{i=1}^{Nb}|mi-ni|}{Nb} \quad (2)$$

Then, the motion class detecting circuit 125 compares the average value AV calculated as described above with one or more threshold values to obtain motion class information MV. For example, when three threshold values th1, th2, and th3 are used to detect four motion classes, if AV≦th1, MV=0, if th1<AV≦th2, MV=1, if th2<AV≦th3, MV=2, and if th3<AV, MV=3.

The image signal processing unit 110 further includes a class combining circuit 126 for obtaining a class code CL representing a class to which a pixel (subject pixel) of an HD signal (1050i signal) to be created belong, based on the re-quantization codes qi output from the space class detecting circuit 124, constituting space class information, and based on the motion class information MV output from the motion class detecting circuit 125.

The class combining circuit 126 calculates a class code CL by equation (3) below. In equation (3), Na represents the number of data (SD pixel data) of space class taps, and P represents the number of re-quantization bits for ADRC.

$$CL = \sum_{i=1}^{Na} qi(2^P)^i + MV \cdot 2^{PNa} \quad (3)$$

The image signal processing unit 110 further includes a coefficient memory 134. The coefficient memory stores a plurality of coefficient data for each class, for an estimate equation used in an estimate calculation circuit 127 to be described later. The coefficient data is used to convert an SD signal (525i signal) into an HD signal (1050i signal). To the coefficient memory 134, the class code CL output from the class combining circuit 126 is supplied as read address information. Then, coefficient data Wi (i=1 to n) for the estimate equation, associated with the class code CL, are read from the coefficient memory 134 and supplied to the estimate calculation circuit 127.

The image signal processing unit 110 further includes an information memory bank 135. In the information memory bank 135, coefficient data for a generating equation, including parameters h and v, for generating elements of a summation matrix for obtaining coefficient data for the estimate equation is stored in advance.

As described earlier, when converting a 525i signal into a 1050i signal, in each of the odd-numbered and even-numbered fields, four pixels of 1050i signal must be obtained correspondingly to one pixel of 525i signal. In that case, four pixels in a 2×2 unit pixel block constituting each of the odd-numbered and even-numbered fields of a 1050i signal have respectively different phase differences with respect to a center prediction tap.

Figure 2:
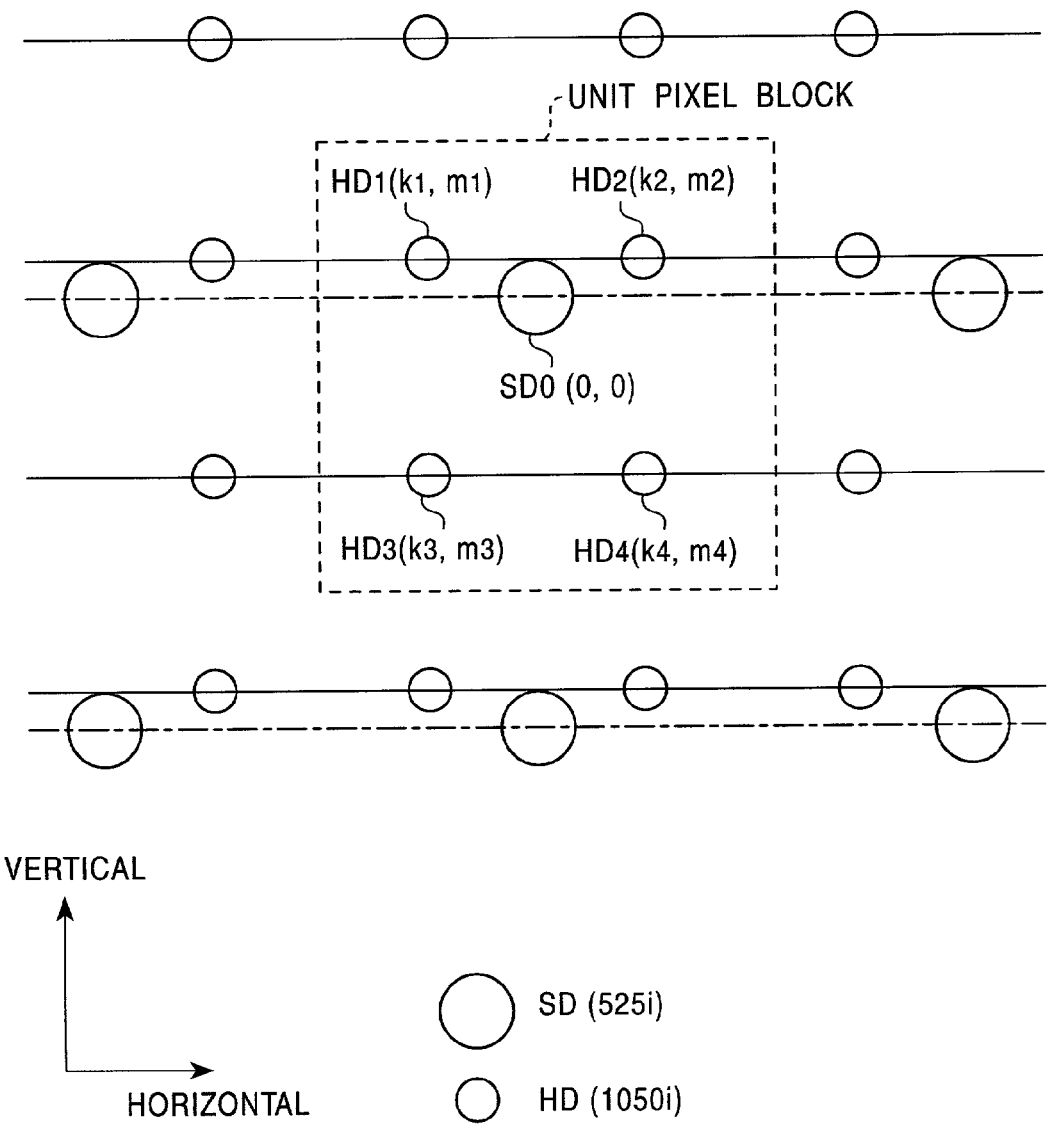
FIG. 2 is a diagram showing phase differences of four pixels in a unit pixel block in an odd-numbered field of an HD signal (1050i signal) with respect to a center prediction tap.

FIG. 2 shows phase differences of four pixels $HD_1$ to $HD_4$ in a 2×2 unit pixel block constituting an odd-numbered field of a 1050i signal with respect to a center prediction tap $SD_0$. The positions of $HD_1$ to $HD_4$ are shifted from the position of $SD_0$ by $k_1$ to $k_4$ in the horizontal direction and $m_1$ to $m_4$ in the vertical direction, respectively.

FIG. 3 shows phase differences of four pixels $HD_1'$ to $HD_4'$ in a 2×2 unit pixel block constituting an even-numbered field of a 1050i signal with respect to a center prediction tap $SD_0'$. The positions of $HD_1'$ to $HD_4'$ are shifted from the position of $SD_0'$ by $k_1'$ to $k_4'$ in the horizontal direction and $m_1'$ to $m_4'$ in the vertical direction, respectively.

Thus, in the information memory bank 135 described above, coefficient data for the generating equation for generating elements of a summation matrix for obtaining coefficient data for the estimate equation is stored for each combination of class and output pixel (HD1 to HD4 and HD1' to HD4').

The coefficient data stored in the information memory bank 135 will be described in detail.

The estimation calculation circuit 127, which will be described later, calculates HD pixel data y to be created by the estimate equation expressed in equation (4) from the prediction tap data (SD pixel data) xi and a plurality of coefficient data Wi read from the coefficient memory 134. For example, if the number of prediction taps selected by the first tap selecting circuit 121 is ten, n in equation (4) is ten.

$$y = \sum_{i=1}^{n} Wi \cdot xi \quad (4)$$

Japanese Patent Application No. 2000-348730, by the assignee of this application, proposes that coefficient data Wi (i=1 to n) of prediction taps for each class be generated by a generating equation including parameters h and v, for example, as expressed in equation (5) below. The coefficient data $w_{10}$ to $w_{n9}$ of the generating equation are obtained by learning and stored in an information memory bank in advance.

$W_1 = w_{10} + w_{11}v + w_{12}h + w_{13}v^2 + w_{14}vh + w_{15}h^2 + w_{16}v^3 + w_{17}v^2h + w_{18}vh^2 + w_{19}h^3$ $W_2 = w_{20} + w_{21}v + w_{22}h + w_{23}w + v^2w_{24}vh + w_{25}h^2 + w_{26}v^3 + w_{27}v^2h + w_{28}vh^2 + w_{29}h^3$

.

.

.

$W_i = W_{i0} + w_{i1}v + w_{i2}h + w_{i3}v^2 + w_{i4}vh + w_{i5}h^2 + w_{i6}v^3 + w_{i7}v^2h + w_{i8}vh^2 + w_{i9}h^3$

.

.

.

$W_n = w_{n0} + w_{n1}v + w_{n2}h + w_{n3}v^2 + w_{n4}v^2h + w_{n5}h^2 + w_{n6}v^3 + w_{n7}v^2h + w_{n8}vh^2 + w_{n9}h^3$ \quad (5)

The generating equation expressed in equation (5) includes parameters h and v, allowing the values of the parameters h and v to be changed so that coefficient data Wi in accordance with the values of the parameters h and v can be obtained, thereby allowing image quality to be adjusted. The generating equation expressed in equation (5), however, directly approximates coefficient data for the estimate equation with stepped values of the parameters h and v; thus it is difficult to find a direct relationship between the values of the parameters h and v and the coefficient data Wi generated based on the values of the parameters h and v, leaving reliability of the coefficient data Wi in doubt.

Figure 4:
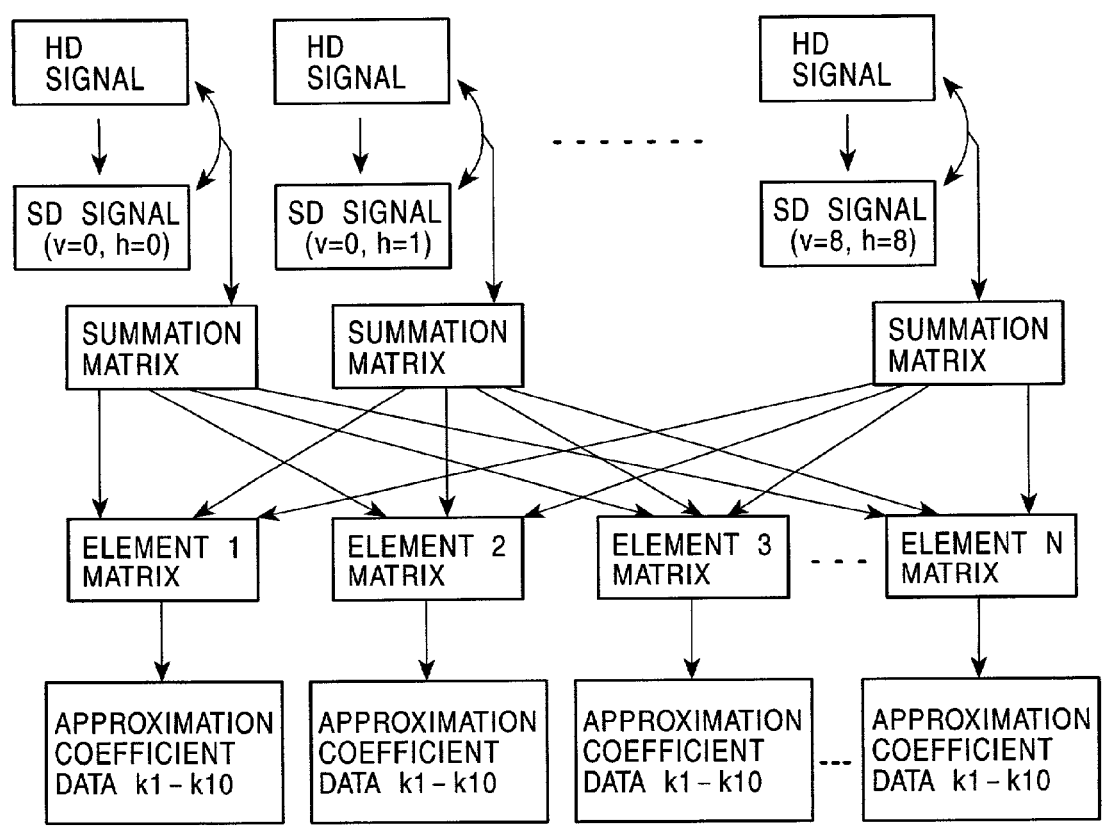
FIG. 4 is a diagram showing the scheme of a method of obtaining coefficient data.

FIG. 4 shows the scheme of a method of obtaining coefficient data to be stored in the information memory bank 135.

First, a plurality of HD signals that serves as student signals is generated from an HD signal that serves as a teacher signal. For example, each of the values of the parameters h and v, which define the horizontal band and the vertical band of a filter to be used for generating SD signals from an HD signal, is changed in nine steps (0 to 8), so that 81 SD signals are generated in total. Then, learning is performed between the SD signals thus generated and the HD signal, so that a summation matrix A for obtaining coefficient data Wi for the estimate equation expressed in equation (4) is generated for each combination of class and output pixel in accordance with the stepped values of the parameters h and v.

The summation matrix A is used to actually solve a normal equation for obtaining coefficient data for the estimate equation expressed in equation (4), for example, by the sweep-out method (Gauss-Jordan elimination).

The coefficient data Wi for the estimate equation is obtained as follows.

First, coefficient data Wi (i=1 to n) for the estimate equation expressed in equation (4) is obtained by the least squares method. As a generalized example, an observation equation expressed in equation (6) below will be considered in relation to input data X, coefficient data W, and predictive values Y. In equation (6), m represents the number of learning data, and n represents the number of prediction taps.

$$XW = Y \quad (6)$$

$$X = \begin{bmatrix} x11 & x12 & \ldots & x1n \\ x21 & x22 & \ldots & x2n \\ \ldots & \ldots & \ldots & \ldots \\ xm1 & xm2 & \ldots & xmn \end{bmatrix}, W = \begin{bmatrix} w_1 \\ w_2 \\ \ldots \\ w_n \end{bmatrix}, Y = \begin{bmatrix} y_1 \\ y_2 \\ \ldots \\ y_m \end{bmatrix}$$

The least squares method is applied to data collected by the observation equation expressed in equation (6). A residual equation expressed in equation (7) below will be considered based on the observation equation expressed in equation (6).

$$XW = Y + E, E = \begin{bmatrix} e1 \\ e2 \\ \ldots \\ em \end{bmatrix} \quad (7)$$

It is understood from the residual equation expressed in equation (7) that the most probable value of Wi is a value that minimizes $e^2$ in equation (8) below. That is, equation (9) below is to be satisfied.

$$e^2 = \sum_{i=1}^{m} ei^2 \quad (8)$$

$$e1\frac{\partial e1}{\partial Wi} + e2\frac{\partial e2}{\partial Wi} + \ldots + em\frac{\partial em}{\partial Wi} = 0 (i = 1, 2, \ldots, n) \quad (9)$$

That is, W1 to Wn are calculated so that n conditions associated with the values of i in equation (9) will be satisfied. Thus, equation (10) below is obtained from the residual equation expressed in equation (7). Furthermore, equation (11) is obtained from equations (10) and (6).

$$\frac{\partial ei}{\partial W1} = xi1, \frac{\partial ei}{\partial W2} = xi2, \ldots, \frac{\partial ei}{\partial Wn} = xin (i = 1, 2, \ldots, m) \quad (10)$$

$$\sum_{i=1}^{m} eixi1 = 0, \sum_{i=1}^{m} eixi2 = 0, \ldots, \sum_{i=1}^{m} eixin = 0 \quad (11)$$

Then, a normal equation expressed in equation (12) below is obtained from equations (7) and (11).

$$\begin{bmatrix} \sum_{j=1}^{m} xj1xj1 & \sum_{j=1}^{m} xj1xj2 & \ldots & \sum_{j=1}^{m} xj1xjn \\ \sum_{j=1}^{m} xj2xj1 & \sum_{j=1}^{m} xj2xj2 & \ldots & \sum_{j=1}^{m} xj2xjn \\ \vdots & \vdots & \ddots & \vdots \\ \sum_{j=1}^{m} xjnxj1 & \sum_{j=1}^{m} xjnxj2 & \ldots & \sum_{j=1}^{m} xjnxjn \end{bmatrix} \begin{bmatrix} W_1 \\ W_2 \\ \vdots \\ W_n \end{bmatrix} = \begin{bmatrix} \sum_{j=1}^{m} xj1yj \\ \sum_{j=1}^{m} xj2yj \\ \vdots \\ \sum_{j=1}^{m} xjnyj \end{bmatrix} \quad (12)$$

The normal equation expressed in equation (12) allows the same number of equations as the number of unknown numbers n to be created, allowing calculation of the most probable value of each of Wi. When the normal equation is solved, for example, by the sweep-out method, calculation is performed in the forma of a matrix expressed in equation (13) below, which is the summation matrix A described earlier.

$$A = \begin{bmatrix} \sum_{j=1}^{m} xj1xj1 & \sum_{j=1}^{m} xj1xj2 & \ldots & \sum_{j=1}^{m} xj1xjn & \sum_{j=1}^{m} xj1yj \\ \sum_{j=1}^{m} xj2xj1 & \sum_{j=1}^{m} xj2xj2 & \ldots & \sum_{j=1}^{m} xj2xjn & \sum_{j=1}^{m} xj2yj \\ \vdots & \vdots & \ddots & \vdots & \vdots \\ \sum_{j=1}^{m} xjnxj1 & \sum_{j=1}^{m} xjnxj2 & \ldots & \sum_{j=1}^{m} xjnxjn & \sum_{j=1}^{m} xjnyj \end{bmatrix} \quad (13)$$

Next, for each combination of class and output pixel, elements are extracted from the summation matrix A generated in accordance with each of the stepped values of the parameters h and v, and the elements are arranged with h as row and v as column, so that the same number of matrices B expressed in equation (14) below as the number of unique elements is generated. Since the summation matrix A is a symmetric matrix, the number of unique elements N is $N=(n^2+3n)/2$.

$$B = \begin{bmatrix} A_{0,0} & A_{0,1} & \cdots & A_{0,8} \\ A_{1,0} & A_{1,1} & \cdots & A_{1,8} \\ \vdots & \vdots & \ddots & \vdots \\ A_{8,0} & {8,1} & \cdots & A_{8,8} \end{bmatrix} \quad (14)$$

Next, for each combination of class and output pixel, the values of elements $A_{0,0}$ to $A_{8,8}$ of each of the same number of matrices B as the number of unique elements are approximated by an approximate equation f(h, v). In that case, the values of the elements $A_{0,0}$ to $A_{8,8}$ are plotted on a h-v plane, and the values are approximated by a curved surface f (h, v) so that the sum of square errors with respect to the point will be minimized. For example, with regard to an element $\Sigma x_5 x_8$, as shown in FIG. 5, the element $\Sigma x_5 x_8$ is extracted from the summation matrix A generated in accordance with each of the stepped values of the parameters h and v, and the values are plotted on a h-v plane as sample points so that the values will be approximated by a curved surface f(h, v).

As the approximate equation f(h, v) used for curved surface approximation, for example, a cubic equation expressed in equation (15) below is used. Approximate values of arbitrary values of the parameters h and v can be obtained by storing ten coefficient data $k_1$ to $k_{10}$.

$$f(h, v) = k_1 + k_2 v + k_3 v^2 + k_4 v^3 + k_5 vh + \quad (15)$$
$$k_6 v^2 h + k_7 vh^2 + k_8 h + k_9 h^2 + k_{10} h^3$$

The coefficient data k1 to k10 in equation (15) are obtained, for example, by the least squares method. Thus, a summation matrix similar to the summation matrix expressed in equation (13) is generated for the matrix B, and coefficient data $k_1$ to $k_{10}$ are obtained, for example, by the sweep-out method.

In contrast to the summation matrix expressed in equation (13), in which values sampled from an SD signal is used as x1, x2, . . . , xn, in this case, values of the parameters h and v in accordance with the approximate equation are sequentially used. That is, when n=10, $x_1=1$, $w_2=v$, $x_3=v^2$, $x_4=v^3$, $x_5=vh$, $x_6=v^2h$, $x_7=vh^2$, $x_8=h$, $x_9=h^2$, and $x_{10}=h^3$. As the values of y, elements of the matrix B in accordance with the values of the parameters h and v are used.

In the memory bank 135 described earlier, coefficient data $k_1$ to $k_{10}$ for equation (15), obtained respectively in association with the elements of the summation matrix as described above, are stored in advance for each combination of class and output pixel ($HD_1$ to $HD_4$ and $HD_1'$ to $HD_4'$).

Referring back to FIG. 1, the image signal processing unit 110 further includes a summation matrix generating circuit 133, which generates elements of the summation matrix A expressed in equation (13) for each combination of class and output pixel, using the generating equation (the approximate equation expressed in equation (15)), based on the coefficient data stored in the information memory bank 135 and in accordance with the values of the parameters h and v, thereby generating the summation matrix A. The image signal processing unit 110 also includes a coefficient determination circuit 136 for calculating coefficient data Wi for each combination of class and output pixel using the summation matrix A.

The coefficient data Wi for the estimate equation is generated by the summation matrix generating circuit 133 and the coefficient determination circuit 136, for example, in each vertical blanking period. Thus, even if the values of the parameters h and v are changed by a user operation of the remote control transmitter 200, coefficient data Wi for each class, stored in the coefficient memory 134, can be immediately changed in accordance with the values of the parameters h and v, allowing smooth adjustment of resolution by the user.

The image signal processing unit 110 further includes a normalization coefficient calculation unit 137, which calculates by equation (16) below normalization coefficients S associated with the coefficient data Wi (i=1 to n) obtained by the coefficient determination circuit 136, and a normalization coefficient memory 138 for storing the normalization coefficients S. In the normalization coefficient memory 138, the class code CL output from the class combining circuit 126 is supplied as read address information, and normalization coefficients S associated with the class code CL are read from the normalization coefficient memory 138 and are then supplied to a normalization calculation unit 128, which will be described later.

$$S = \sum_{i=1}^{n} W_i \quad (16)$$

The image signal processing unit 110 further includes an estimate calculation circuit 127, which calculates data of a pixel (subject pixel) of an SD signal to be created, by the estimate equation expressed in equation (4) from the prediction tap data (SD pixel data) xi selectively extracted by the first tap selecting circuit 121 and the coefficient data Wi read from the coefficient memory 134.

As described earlier, when converting an SD signal (525i signal) into an HD signal (1050i signal), four pixels of HD signal ($HD_1$ to $HD_4$ in FIG. 2 and $HD_1'$ to $HD_4'$ in FIG. 3) must be obtained in association with one pixel of SD signal. Thus, the estimate calculation circuit 127 generates pixel data for each 2×2 unit pixel block constituting the HD signal. That is, to the estimate calculation circuit 127, prediction tap data xi associated with four pixels (subject pixels) in a unit pixel block is supplied from the first tap selecting circuit 121, and coefficient data Wi associated with the four pixels constituting the unit pixel block is supplied from the coefficient memory 134, so that data $y_1$ to $y_4$ of the four pixels constituting the unit pixel block are individually calculated by the estimate equation expressed in equation (4).

The image signal processing unit 110 further includes a normalization calculation circuit 128 for dividing and normalizing the data $y_1$ to $y_4$ of the four pixels, sequentially output from the estimate calculation circuit 127, by normalization coefficients S associated with coefficient data Wi (i=1 to n) used in the respective calculations, read from the normalization coefficient memory 138. Although not described earlier, when the coefficient determination circuit 136 obtains coefficient data Wi for the estimate equation using the summation matrix A, the coefficient data Wi thus obtained includes round-off error, and thus it is not guaranteed that the total of the coefficient data Wi (i=1 to n) is 1.0. Thus, the levels of the data y1 to y4 calculated by the estimate calculation circuit 127 are shifted due to the round-off error.

The image signal processing unit 110 further includes a post-processing circuit 129, which line-sequentializes data $y_1'$ to $y_4'$ of the four pixels in the unit pixel block, normalized by the normalization calculation circuit 128 and sequentially supplied, outputting the result in the format of 1050i signal.

Now, the operation of the image signal processing unit 110 will be described.

The second tap selecting circuit 122 selectively extracts data (SD pixel data) of space class taps positioned around the four pixels (subject pixels) of a unit pixel block constituting an HD signal (1050i signal) to be created, from an SD signal (525i signal) stored in the buffer memory 109. The data (SD pixel data) of space class taps selectively extracted by the second tap selecting circuit 122 is supplied to the space class detecting circuit 124. The space class detecting circuit 124 executes an ADRC process on the SD pixel data representing space class taps, obtaining re-quantization codes constituting space class information (classification mainly for representing spatial waveform), as expressed in equation (1).

Also, the third tap selecting circuit 123 selectively extracts data (SD pixel data) of motion class taps positioned around the four pixels (subject pixels) of the unit pixel block constituting the HD signal (1050i signal) to be created, from the SD signal (525i signal) stored in the buffer memory 109. The data (SD pixel data) of motion class taps selectively extracted by the third tap selecting circuit 123 is supplied to the motion class detecting circuit 125. The motion class detecting circuit 125 obtains motion class information MV (classification mainly for representing degree of motion) from the SD pixel data constituting motion class tap data.

The motion class information MV and the re-quantization codes qi are supplied to the class combining circuit 126. The class combining circuit 126 obtains a class code CL representing a class to which the four pixels (subject pixels) in each unit pixel block constituting the HD signal (1050i signal) to be created belong, based on the motion class information MV and the re-quantization codes qi. The class code CL is supplied to the coefficient memory 134 and to the normalization coefficient memory 138 as read address information.

The coefficient memory 134, for example, in each vertical blanking period, stores coefficient data Wi (i=1 to n) for the estimate equation, calculated by the summation matrix generating unit 133 and the coefficient determination circuit 136 for each combination of class and output pixel ($HD_1$ to $HD_4$ and $HD_1'$ to $HD_4'$) in accordance with the values of the parameters h and v adjusted by the user. The normalization coefficient memory 138 stores normalization coefficients S generated by the normalization coefficient calculation unit 137 in accordance with the coefficient data Wi (i=1 to n) for the estimate equation, calculated by the coefficient determination circuit 136 as described above.

According to the class code CL supplied as read address information as described above, coefficient data Wi for an estimate equation for the four output pixels ($HD_1$ to $HD_4$ for an odd-numbered field and $HD_1'$ to $HD_4'$ for an even-numbered field) corresponding to the class code CL is read from the coefficient memory 134 and supplied to an estimate calculation circuit 127. Also, the first tap selecting circuit 121 selectively extracts data (SD pixel data) of prediction taps positioned around the four pixels (subject pixels) in the unit pixel block constituting the HD signal (1050i signal) to be created from the SD signal (525i signal) stored in the buffer memory 109.

The estimate calculation circuit 127 calculates data $y_1$ to $y_4$ of the four pixels (subject pixels) in the unit pixel block constituting the HD signal to be created from the data (SD pixel data) xi of prediction taps and coefficient data Wi for the four output pixels read from the coefficient memory 134, as expressed in equation (4). The data $y_1$ to $y_4$ of the four pixels in the unit pixel block constituting the HD signal are sequentially output from the estimate calculation circuit 127 and supplied to the normalization calculation circuit 128.

As described above, the class code CL is supplied to the normalization coefficient memory 138 as read address information, and normalization coefficients S associated with the class code CL, i.e., normalization coefficients S in accordance with the coefficient data Wi used for calculation of the HD pixel data $y_1$ to $y_4$, are read from the normalization coefficient memory 138 and supplied to the normalization calculation circuit 128. The normalization calculation circuit 128 divides and normalizes the HD pixel data $y_1$ to $y_4$ output from the estimate calculation circuit 127 by the normalization coefficients S. Thus, shifts in levels of the data $y_1$ to $y_4$, associated with errors that occurred when rounding the coefficient data Wi for the estimate equation expressed in equation (4) by the summation matrix A expressed in equation (13), are removed.

The data $y_1$ to $y_4'$ of the four pixels in the unit pixel block, normalized in the normalization calculation circuit 128 and sequentially output, are supplied to the post-processing circuit 129. Then, the post-processing circuit 129 line-sequentializes the data $y_1'$ to $y_4'$ of the four pixels in the unit pixel block, sequentially supplied from the normalization calculation circuit 128, outputting the results in the format of 1050i signal. That is, the post-processing circuit 129 outputs a 1050i signal, i.e., an HD signal.

As described above, in the television receiver 100 shown in FIG. 1, the summation matrix generating unit 133 generates elements of a summation matrix A, expressed in equation (13), in accordance with the values of the parameters h and v, for each combination of classes and output pixels, using the approximation equation expressed in equation (15) and based on coefficient data stored in the information memory bank 135. Then, the coefficient determination circuit 136 calculates coefficient data Wi of an estimate equation in accordance with the values of the parameters h and v using the summation matrix A for each combination of classes and output pixels. The coefficient data Wi for an estimate equation for each combination of classes and output pixels is stored in the coefficient memory 134. Then, the estimate calculation circuit 127 calculates HD pixel data y using coefficient data read in accordance with a class code CL from the coefficient memory 134.

Thus, the user is allowed to arbitrarily adjust the horizontal and vertical resolutions of an image based on an HD signal by adjusting the values of the parameter h and v. In this case, coefficient data Wi for each combination of classes and output pixels is generated in accordance with the values of the parameters h and v having been adjusted each time by the summation matrix generating circuit 133 and the coefficient determination circuit 136, so that a memory for storing a large amount of coefficient data is not needed.

Furthermore, in the television receiver 100 shown in FIG. 1, coefficient data Wi for an estimate equation in accordance with the values of the parameters h and v, stored in the information memory bank 135, is obtained not by assigning the values of the parameters h and v to the generating equation expressed in equation (5), which directly approximates coefficient data Wi of the estimate equation, but by assigning the values of the parameters h and v to a generating equation that approximates elements of a summation matrix A for obtaining coefficient data of the estimate equation, which is highly dependent on change in the values of the parameters h and v. Thus, coefficient data Wi for the estimate equation will be more reliably in accordance with the values of the parameters h and v, so that HD signals in accordance with the values of the parameters h and v can be favorably obtained. Accordingly, the user is allowed to smoothly adjust the horizontal and vertical resolutions of an image based on an HD signal by adjusting the values of the parameters h and v.

It was examined whether a conventional method in which coefficient data Wi for an estimate equation in accordance with the values of the parameters h and v is generated and used in equation (5) or a proposed method in which elements of a summation matrix A in accordance with the values of the parameters h and v are generated in equation (15) and in which coefficient data Wi for an estimate equation is generated using the summation matrix A as in this embodiment is more suitable for generating an image of an intermediate frequency in accordance with values of the parameters h and v that were not used for learning.

First, using SD signals of twenty resolutions, i.e., combination of five stepped values of h (=0, 2, 4, 6, and 8) and four stepped values of v (=0, 2, 4, and 6), as student signals, coefficient data $W_{10}$ to $W_{n9}$ in equation (5) and coefficient data $k_1$ to $k_{10}$ in equation (15), associated with elements of the summation matrix A, were obtained.

Figure 6A:
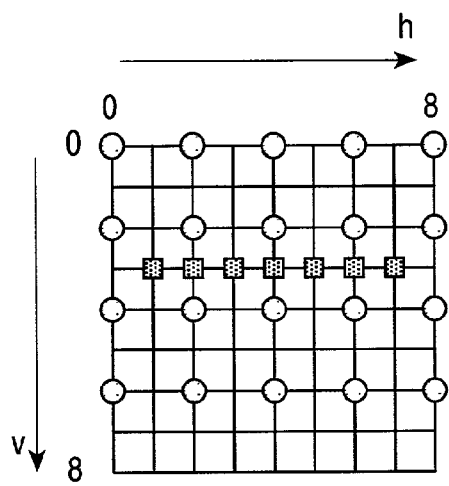
FIGS. 6A and 6B are diagrams showing examination of reliability in a conventional method and in a proposed method.

Then, as indicated by square dots in FIG. 6A, HD signals were generated using coefficient data Wi for the estimate equation, generated by the conventional method in association with each combination of the values of the parameters h and v, from the SD signals generated from HD signals respectively generated in association with combinations of v and h with v fixed to v=3 and h varied as h=1, 2, ... 7. Then, S/N was calculated between the generated HD signals and the corresponding original HD signals, respectively. In FIG. 6A, circular dots indicate the values of the parameters h and v used for learning.

S/N is defined, for example, as equation (17) below. In equation (17), n represents the number of pixels, Ai represents the pixel value of the ith pixel in the generated HD signal, and Bi represents the pixel value of the ith pixel in the original HD signal. According to the definition, the value of S/N becomes larger as the corresponding pair of the pixel values Ai and Bi becomes closer and the denominator becomes smaller accordingly.

$$S/N = 20.0 \times \log_{10} \frac{255}{\sqrt{\frac{\sum_{i=1}^{n} A_i - B_i}{n}}} \quad (17)$$

Similarly, HD signals were generated using coefficient data Wi for the estimate equation, generated by the proposed method in association with each combination of the values of the parameters h and v, from the SD signals generated from HD signals respectively generated in association with combinations of v and h with v fixed to v=3 and h varied as h=1, 2, ... 7. Then, S/N was calculated by equation (17) between the generated HD signals and the corresponding original HD signals, respectively.

Figure 6B:
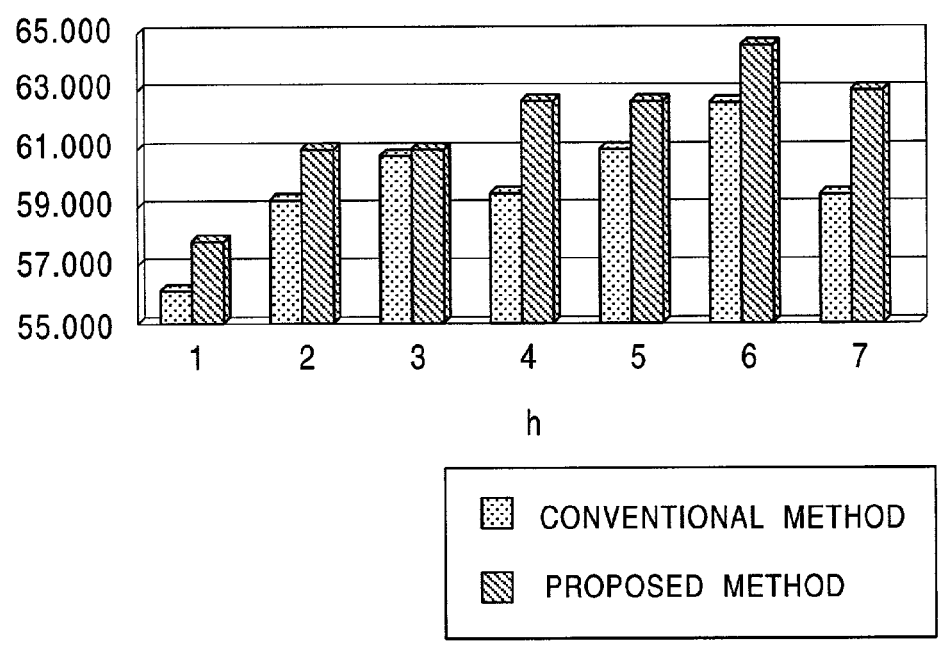

FIG. 6B shows comparison of S/N calculated by the conventional method and the proposed method as described above for each combination of v and h with v fixed to v=3 and h varied as h=1, 2, ..., 7. The value of S/N associated with the proposed method was larger than the value of S/N associated with the conventional method.

Also, using SD signals of twenty resolutions, i.e., combination of five stepped values of h (=0, 2, 4, 6, and 8) and four stepped values of v (=0, 2, 4, and 6), as student signals, coefficient data $W_{10}$ to $W_{n9}$ in equation (5) and coefficient data $k_1$ to $k_{10}$ in equation (15), associated with elements of the summation matrix A, were obtained.

Figure 7A:
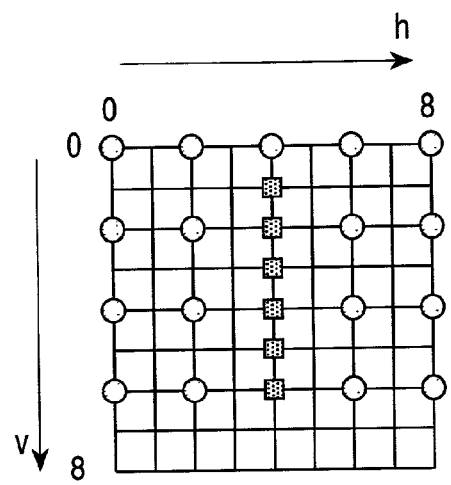
FIGS. 7A and 7B are diagrams showing examination of reliability in a conventional method and in a proposed method.

Then, as indicated by square dots in FIG. 7A, HD signals were generated using coefficient data Wi for the estimate equation, generated by the conventional method in association with each combination of the values of the parameters h and v, from the SD signals generated from HD signals respectively generated in association with combinations of h and v with h fixed to h=4 and v varied as v=1, 2, ... 6. Then, S/N was calculated by equation (17) between the generated HD signals and the corresponding original HD signals, respectively. In FIG. 7A, circular dots indicate the values of the parameters h and v used for learning. Also, three points indicated by square dots, namely, (h, v)=(4, 2), (4, 4), and (4, 6) were used for learning.

Similarly, HD signals were generated using coefficient data Wi for the estimate equation, generated by the proposed method in association with each combination of the values of the parameters h and v, from the SD signals generated from HD signals respectively generated in association with combinations of h and v with h fixed to h=4 and v varied as v=1, 2, ... 6. Then, S/N was calculated by equation (17) between the generated HD signals and the corresponding original HD signals, respectively.

Figure 7B:
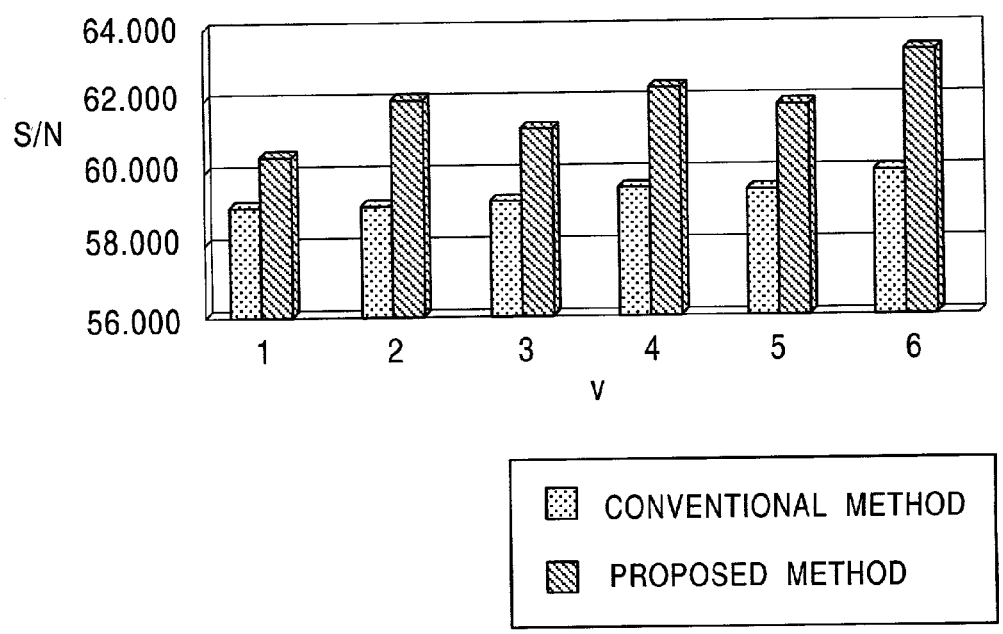

FIG. 7B shows comparison of S/N calculated by the conventional method and the proposed method as described above for each combination of v and h with v fixed to h=4 and v varied as h=1, 2, ..., 6. The value of S/N associated with the proposed method was larger than the value of S/N associated with the conventional method.

From what has been described above, it was verified that coefficient data Wi for an estimate equation, generated by the proposed method, was more reliably in accordance with the values of the parameters h and v compared with coefficient data Wi for an estimate equation, generated by the conventional method.

In the television receiver 100 shown in FIG. 1, the summation matrix generating circuit 133 and the coefficient determination circuit 136 generate coefficient data Wi for each class and store it in the coefficient memory 134, and read from the coefficient memory 134 coefficient data associated with a class code CL output from the class combining circuit 126. Alternatively, the summation matrix generating circuit 133 and the coefficient determination circuit 136 may generate coefficient data Wi associated with a class code from the class combining circuit 126 on each occasion, which will be used by the estimate calculation circuit 127. In that case, the coefficient memory 134 is not required. Furthermore, the normalization coefficient memory 138 is not required either.

Figure 8:
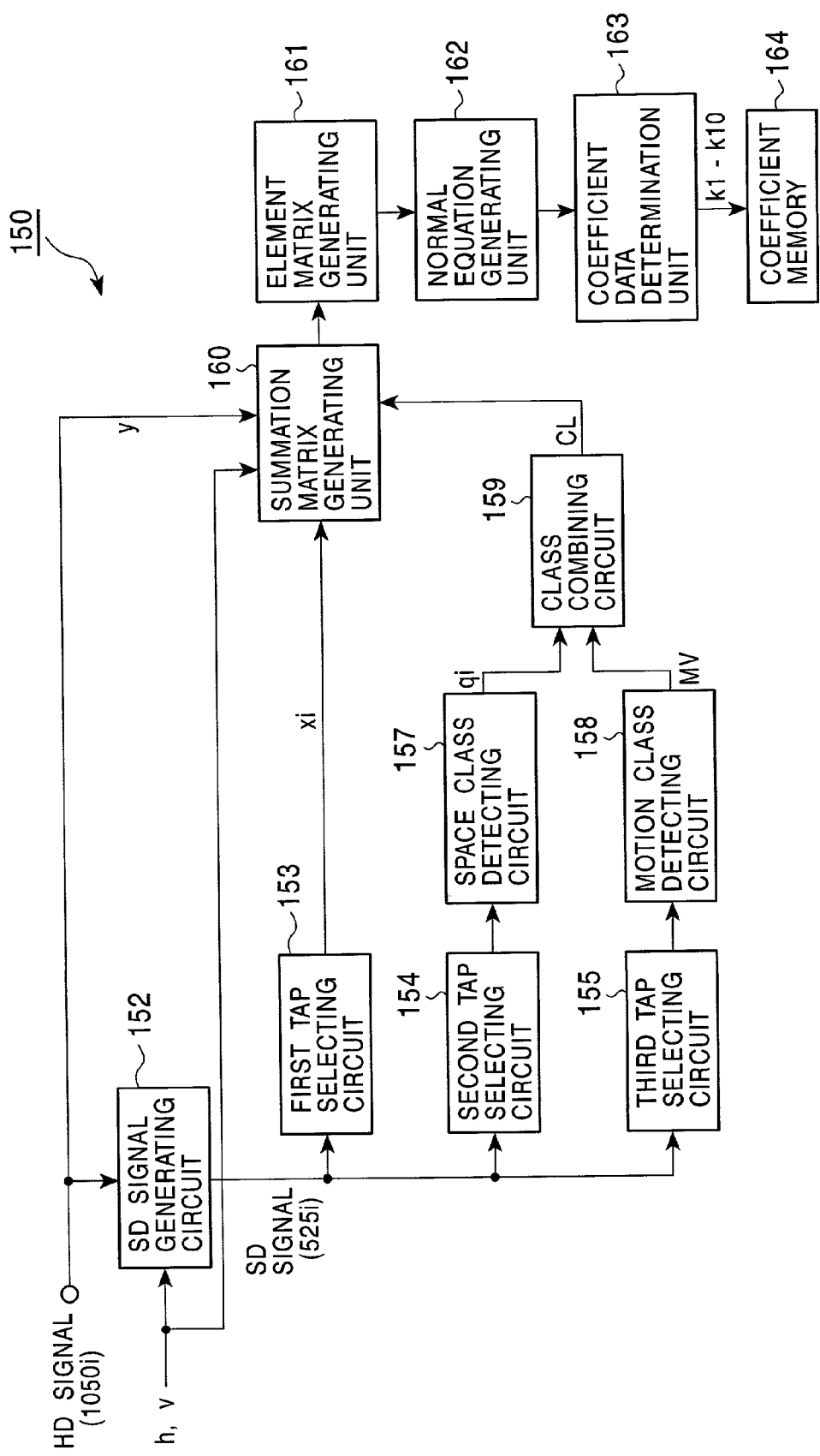
FIG. 8 is a block diagram showing an example construction of a coefficient data obtaining apparatus.

FIG. 8 shows the construction of a coefficient data obtaining apparatus 150 for obtaining coefficient data based on the scheme shown in FIG. 4.

The coefficient data obtaining apparatus 150 includes an input terminal 151 for receiving input of an HD signal (1050i signal) that serves as a teacher signal, and an SD signal generating circuit 152 for performing horizontal and vertical decimations on the HD signal to generate an SD signal that serves as a student signal.

To the SD signal generating circuit 152, the parameters h and v are supplied as control signals. In accordance with the values of the parameters h and v, the horizontal band and vertical band of a filter used for generating an SD signal from an HD signal are changed.

The filter is composed of, for example, a one-dimensional Gaussian filter for restricting the horizontal band and a one-dimensional Gaussian filter for restricting the vertical band. The one-dimensional Gaussian filters can each be represented as equation (18) below. By changing the value of standard deviation σ in steps in accordance with the stepped values of the parameters h and v, the one-dimensional Gaussian filters achieve frequency characteristics in accordance with the stepped values of the parameters h and v.

$$\text{Out} = \frac{1.0}{\sigma\sqrt{2.0\pi}} e^{\frac{-(4.0\times -37)^2}{2.0\sigma^2}} \qquad (18)$$

The coefficient data obtaining apparatus 150 further includes first to third tap selecting circuits 153 to 155, which selectively extract data of a plurality of SD pixels positioned around a subject pixel associated with an HD signal (1050i signal) from the SD signal (525i signal) output from the SD signal generating circuit 152. The first to third tap selecting circuits 153 to 155 are constructed identically to the first to third tap selecting circuits in the image signal processing unit 110 described earlier.

The coefficient data obtaining apparatus 150 further includes a space class detecting circuit 157, which detect a distribution pattern of levels of space class tap data (SD pixel data) selectively extracted by the second tap selecting circuit 154, thereby detecting a space class based on the pattern of level distribution and outputting space class information. The space class detecting circuit 157 is constructed identically to the space class detecting circuit 124 in the image signal processing unit 110 described earlier. The space class detecting circuit 157 outputs, as space class information, re-quantization codes qi for each SD pixel data constituting the data of space class taps.

The coefficient data obtaining apparatus 150 further includes a motion class detecting circuit 158, which detects a motion class, mainly representing degree of motion, from the data (SD pixel data) of motion class taps selectively extracted by the third tap selecting circuit 155, thereby outputting motion class information MV. The motion class detecting circuit 158 is constructed identically to the motion class detecting circuit 125 in the image signal processing unit 110 described earlier. The motion class detecting circuit 158 calculates the differences between frames from the data (SD pixel data) of motion class taps selectively extracted by the third tap selecting circuit 155, and applies a threshold operation on the average of the absolute values of the differences, thereby detecting a motion class representing motion.

The coefficient data obtaining apparatus 150 further includes a class combining circuit 159, which obtains a class code CL representing a class to which a subject pixel associated with an HD signal (1050i signal) belongs to, based on the re-quantization codes qi constituting the space class information output from the space class detecting circuit 157 and the motion class information MV output from the motion class detecting circuit 158. The class combining circuit 159 is constructed identically to the class combining circuit 126 in the image signal processing unit 110 described earlier.

The data obtaining apparatus 150 further includes a summation matrix generating unit 160, which generates a summation matrix A expressed in equation (13) for obtaining coefficient data Wi (i=1 to n) for the estimate equation expressed in equation (4) for each class from the HD pixel data y constituting subject pixel data, obtained from the HD signal supplied to the input terminal 151, the prediction tap data (SD pixel data) xi selectively extracted by the first tap selecting circuit 153 respectively in association with the HD pixel data y, and the class codes CL output from the class combining circuit 159 respectively in association with the HD pixel data y.

In this case, learning data is generated by combining a single HD pixel data y and data (SD pixel data) xi of n prediction taps. The summation matrix generating unit 160 generates a summation matrix A for each output pixel ($HD_1$ to $HD_4$ in FIG. 2 and $HD_1'$ to $HD_4'$ in FIG. 3). For example, a summation matrix A associated with $HD_1$ is generated from learning data constituted of data y of an HD pixel having the same relationship as $HD_1$ as to deviation from the center prediction tap.

Furthermore, the values of the parameters h and v input to the SD signal generating circuit 152 are sequentially changed. The summation matrix generating unit 160 generates a summation matrix A in accordance with each of the stepped values of the parameters h and v. Thus, the summation matrix generating unit 160 generates a summation matrix A for obtaining coefficient data Wi for the estimate equation expressed in equation (4) for each combination of class and output pixel in accordance with each of the stepped values of the parameters h and v.

The coefficient data obtaining apparatus 150 further includes an element matrix generating unit 161, which extracts elements of the summation matrix A generated in accordance with each of the stepped values of the parameters h and v for each combination of class and position of output pixel by the summation matrix generating unit 160, arranging the elements with h as row and v as column, thereby generating the same number of matrices (element matrices) B as the number of unique elements, as expressed in equation (14).

The coefficient data obtaining apparatus 150 approximates the values of elements $A_{0,0}$ to $A_{8,8}$ for each of the same number of matrices B as the number of unique elements by the approximate equation f(h, v) expressed in equation (15), for each combination of class and position of output pixel. The coefficient data obtaining apparatus 150 includes a normal equation generating unit 162 for generating normal equations (summation matrix) for obtaining coefficient data $k_1$ to $k_{10}$ for the approximate equation f(h, v) by the least squares method, a coefficient data determination unit 163 for solving each of the normal equations to obtain coefficient data $k_1$ to $k_{10}$ for each combination of class and position of output pixel, and a coefficient memory 164 for storing the coefficient data $k_1$ to $k_{10}$ thus obtained. The coefficient data determination unit 163 solves the normal equations, for example, by the sweep-out method, thereby obtaining coefficient data $k_1$ to $k_{10}$.

Now, the operation of the data obtaining apparatus 150 shown in FIG. 8 will be described.

To the input terminal 151, an HD signal (1051i signal) that serves as a teacher signal is supplied. The input HD signal is horizontally and vertically decimated in the SD signal generating circuit 152, whereby an SD signal (525i signal) that serves as a student signal is generated. In this case, to the SD signal generating circuit 152, parameters h and v are supplied as control signals, so that a plurality of SD signals is sequentially generated in accordance with the horizontal and vertical bands changed in steps.

The second tap selecting circuit 154 selectively extracts data (SD pixel data) of space class taps positioned around a subject pixel associated with the HD signal (1050i signal) from the SD signals (525i signal). The data (SD pixel data) of space class taps selectively extracted by the second tap selecting circuit 154 is supplied to the space class detecting circuit 157. The space class detecting circuit 157 performs an ADRC process on each of the SD pixel data constituting the space class tap data, generating and outputting re-quantization codes qi constituting space class information (classification mainly for representing spatial waveform), as expressed in equation (1).

Furthermore, the third tap selecting circuit 155 selectively extracts data (SD pixel data) of motion class taps positioned around a subject pixel associated with the HD signal from the SD signals generated by the SD signal generating circuit 152. The data (SD pixel data) of motion class taps selectively extracted by the third tap selecting circuit 155 is supplied to the motion class detecting circuit 158. The motion class detecting circuit 158 generates motion class information MV (classification mainly for representing degree of motion) from each of the SD pixel data constituting motion class tap data.

The class information MV and the re-quantization codes qi are supplied to the class combining circuit 159. The class combining circuit 159 generates a class code CL representing a class to which the subject pixel associated with the HD signal (1050i signal) belongs from the motion class information MV and the re-quantization codes qi, as expressed in equation (3).

Furthermore, the first tap selecting circuit 153 selectively extracts data (SD pixel data) of prediction taps positioned around the subject pixel associated with the HD signal from the SD signals generated by the SD signal generating circuit 152. Based on each of the HD pixel data y constituting subject pixel data, obtained from the HD signal supplied to the input terminal 151, prediction tap data (SD pixel data) selectively extracted by the first tap selecting circuit 153 in association with each of the HD pixel data y, and the class code CL output from the class combining circuit 159 in association with each of the HD pixel data y, the summation matrix generating unit 160 individually generates a summation matrix A for obtaining coefficient data Wi for the estimate equation for each combination of class and position of output pixel ($HD_1$ to $HD_4$ in FIG. 2 and $HD_1'$ to $HD_4'$ in FIG. 3) in accordance with each of the stepped values of the parameters h and v, as expressed in equation (13).

Then, the element matrix generating unit 161 extracts elements from the summation matrix A generated in accordance with each of the stepped values of the parameters h and v for each combination of class and position of output pixel, and the elements are arranged with h as row and v as column, generating the same number of matrices (element matrices) B expressed in equation (14) as the number of unique elements.

The normal equation generating unit 162 individually generates a normal equation (summation matrix) for obtaining, by the least squares method, coefficient data $k_1$ to $k_{10}$ for an approximate equation f(h, v), expressed in equation (15), for approximating the values of elements $A_{0,0}$ to $A_{8,8}$ of each of the same number of matrices B as the number of unique elements, for each combination of class and position of output pixel.

Then, the coefficient data determination unit 163 solves each of the normal equations (summation matrices) to obtain coefficient data $k_1$ to $k_{10}$ for each combination of class and position of output pixel, which are stored in the coefficient memory 164.

As described above, the coefficient data obtaining apparatus 150 shown in FIG. 8 is allowed to obtain coefficient data $k_1$ to $k_{10}$ for the generating equation, expressed in equation (15), for generating elements of a summation matrix for obtaining coefficient data Wi for the estimate equation, for each combination of class and position of output pixel ($HD_1$ to $HD_4$ and $HD_1'$ to $HD_4'$), which are to be stored in the information memory bank 135 in the image signal processing unit 110 in FIG. 1.

The coefficient data obtaining apparatus 150 shown in FIG. 8 generates a student signal (525i signal) from a teacher signal (1050i signal) and performs learning accordingly. Alternatively, learning may be performed based on a teacher signal and a student signal that are acquired independently of each other, for example, by using an imaging device that is capable of acquiring a teacher signal and a student signal.

Figure 9:
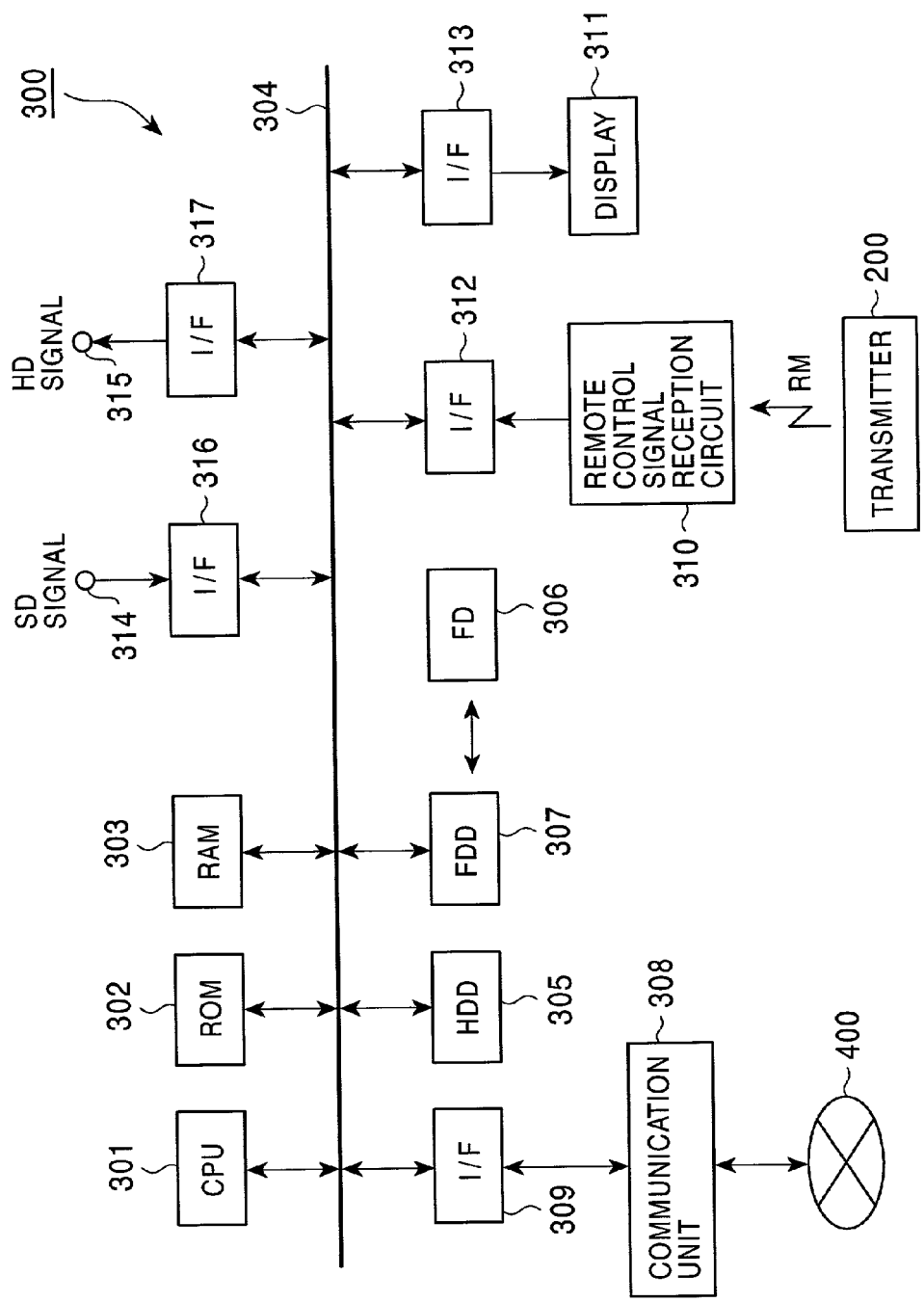
FIG. 9 is a block diagram showing an example construction of an image signal processing apparatus for implementing the present invention in software.

The processes by the image signal processing unit 110 in FIG. 1 may be implemented in software, for example, in cooperation with an image signal processing apparatus 300 shown in FIG. 9.

First, the image signal processing apparatus 300 shown in FIG. 9 will be described. The image signal processing apparatus 300 includes a CPU 301 for overall control of the apparatus, a ROM (read-only memory) 302 storing operation programs for the CPU 301, coefficient data $k_1$ to $k_{10}$ (the same as those stored in advance in the information memory bank 135 in the image signal processing unit 110 in FIG. 1), etc., and a RAM (random access memory) 303 that serves as a working area for the CPU 301. Each of the CPU 301, the ROM 302, and the RAM 303 is connected to a bus 304.

The image signal processing apparatus 300 further includes a hard disk drive (HDD) 305 that functions as an external storage apparatus, and a floppy (R) disk drive (FDD) 307 for driving a floppy (R) disk 306. Each of the drives 305 and 307 is connected to the bus 304.

The image signal processing apparatus 300 further includes a communication unit 308 that is connected by wire or linked by wireless to a communication network 400 such as the Internet. The communication unit 308 is connected to the bus 304 via an interface 309.

The image signal processing apparatus 300 further includes a user interface unit. The user interface unit includes a remote control signal reception circuit 310 for receiving a remote control signal RM from the remote control transmitter 200, and a display 311 implemented, for example, by an LCD (liquid crystal display). The remote control signal reception circuit 310 is connected to the bus 304 via an interface 312, and the display 311 is connected to the bus 304 via an interface 313.

The image signal processing apparatus 300 further includes an input terminal 314 for receiving input of an SD signal, and an output terminal 315 for outputting an HD signal. The input terminal 314 is connected to the bus 304 via an interface 316, and the output terminal 315 is connected to the bus 304 via an interface 317.

Instead of being stored in advance in the ROM 302 as described above, for example, the processing programs, the coefficient data $k_1$ to $k_{10}$ etc. may be downloaded via the communication unit 308 from the communication network 400 such as the Internet and stored in a hard disk or the RAM 303. Also, the processing programs, the coefficient data, etc. may be provided via the floppy (R) disk 306.

Furthermore, instead of being input to the input terminal 314, an SD signal to be processed may be recorded in advance in a hard disk, or downloaded via the communication unit 308 from the communication network 400 such as the Internet. Furthermore, alternatively or in addition to being output to the output terminal 315, an HD signal obtained may be, for example, supplied to and displayed on the display 311, stored in a hard disk, or forwarded onto the communication network 400 such as the Internet via the communication unit 308.

Now, a processing procedure for obtaining an HD signal from an SD signal in the image signal processing apparatus 300 shown in FIG. 9 will be described with reference to a flowchart shown in FIG. 10.

The image signal processing apparatus 300 starts processing in step ST1. In step ST2, the image signal processing apparatus 300 inputs SD pixel data on a frame basis or on a field basis. If the SD pixel data is input from the input terminal 314, the SD pixel data is temporarily stored in the RAM 303. If the SD pixel data is recorded in the hard disk, the SD pixel data is read by the hard disk drive 307 and is then temporarily stored in the RAM 303. Then, in step ST3, the image signal processing apparatus 300 determines whether the processing has been finished for all the frames or fields of the input SD pixel data. If it is determined that the processing has been finished, the image signal processing apparatus 300 exits the processing in step ST4. If the processing has not been finished, the image signal processing apparatus 300 proceeds to step ST5.

In step ST5, the image signal processing apparatus 300 reads specified values of image quality input by a user operation of the remote control transmitter 200, i.e., the values of the parameters h and v, for example, from the RAM 303. Then, in step ST6, the image signal processing apparatus 300 reads coefficient data $k_1$ to $k_{10}$, for example, from the ROM 302.

Then, in step ST7, the image signal processing apparatus 300 generates elements of a summation matrix expressed in equation (13) in accordance with the values of the parameters h and v for each combination of class and output pixel, by the generating equation expressed in equation (15) using the values of the parameters h and v read in step ST5 and the coefficient data $k_1$ to $k_{10}$ acquired in step ST6, and generates coefficient data Wi for the estimate equation using the summation matrix A.

In step ST8, the image signal processing apparatus 300 obtains from the SD pixel data input in step ST2 pixel data of class tap and prediction tap in association with each HD pixel data to be generated. Then, in step ST9, the image signal processing apparatus 300 determines whether the process for obtaining HD pixel data has been finished for the entire area of the input SD pixel data. If the process has been finished, the image signal processing apparatus 300 returns to step ST2, in which SD pixel data of a next frame or field is input. If the process has not been finished, the image signal processing apparatus 300 proceeds to step ST10.

In step ST10, the image signal processing apparatus 300 generates a class code CL from the SD pixel data of class taps obtained in step ST9. Then, in step ST11, the image signal processing apparatus 300 generates HD pixel data by the estimate equation using coefficient data associated with the class code CL and the SD pixel data of prediction taps. The image signal processing apparatus 300 then returns to step ST8, repeating the same process as described above.

Figure 10:
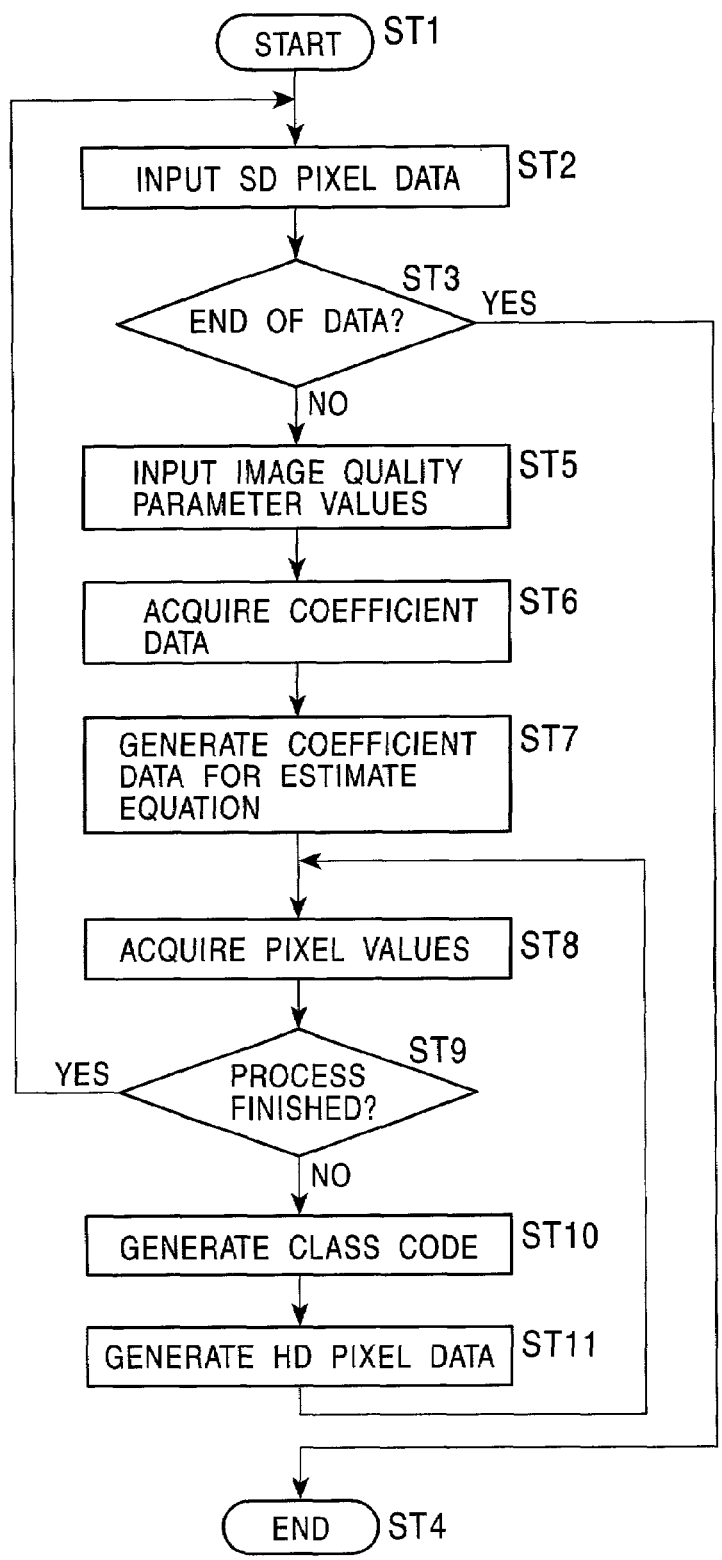
FIG. 10 is a flowchart showing processing of an image signal.

As described above, by executing the process according to the flowchart shown in FIG. 10, SD pixel data constituting an input SD signal is processed to yield HD pixel data constituting an HD signal. As described earlier, the HD signal obtained by the above process is output to the output terminal 315, supplied to the display 311 so that a corresponding image will be displayed, or supplied to the hard disk drive 305 and recorded on a hard disk.

Furthermore, the processes by the data obtaining apparatus 150 in FIG. 8 may be implemented in software, in cooperation with a processing apparatus, although not shown.

Now, a processing procedure for generating coefficient seed data will be described with reference to a flowchart shown in FIG. 11.

First, the processing starts in step ST41. In step ST42, a pattern of image quality (e.g., specified by the values of the parameters h and v) to be used for learning is selected. Then, in step ST43, it is determined whether the process for calculating coefficient data has been finished for all the patterns of image quality. If the process has not been finished, the processing proceeds to step ST44.

In step ST44, known HD pixel data is input on a frame basis or on a field basis. Then, in step ST45, it is determined whether the process has been finished for all the HD pixel data. If the process has not been finished, in step ST46, SD pixel data is generated from the HD pixel data input in step ST44, based on the pattern of image quality selected in step ST42.

Then, in step ST47, pixel data of class tap and prediction tap is obtained from the SD pixel data generated in step ST46, in association with each of the HD pixel data input in step ST44. Then, in step ST48, it is determined whether the learning process has been finished for the entire area of the SD pixel data that has been generated. If the learning process has been finished, the processing returns to step ST44, in which a next HD pixel data is input, and the same process as described above is repeated. If the learning process has not been finished, the processing proceeds to step ST49.

In step ST49, a class code CL is generated from the SD pixel data of class tap obtained in step ST47. Then, in step ST50, a normal equation for obtaining coefficient data, expressed in equation (12), is generated. In this example, normal equations for generating coefficient data Wi are generated individually for combinations of class and output pixel. The processing then returns to step ST47.

If it is determined in step ST45 that the process has been finished for all the HD pixel data, in step ST51, a summation matrix A expressed in equation (13) is generated for each of the combinations of class and output pixel from the normal equations generated in step ST50. Then, the processing returns to step ST42, in which a next pattern of image quality is selected, and the same process as described above is repeated, whereby a summation matrix A in accordance with the next pattern of image quality is generated for each combination of class and output pixel.

If it is determined in step ST43 that the process for generating a summation matrix A has been finished for all the patterns of image quality, the processing proceeds to step ST52. In step ST52, elements are extracted from the summation matrices A generated respectively in accordance with the stepped values of the parameters h and v for each combination of class and output pixel, and the elements are arranged with h as row and v as column, generating the same number of matrices (element matrices) B expressed in equation (14) as the number of unique elements.

Then, in step ST53, coefficient data $k_1$ to $k_{10}$ for an approximate equation f(h, v) expressed in equation (15), which approximates values of the elements $A_{0,0}$ to $A_{8,8}$ of each of the same number of matrices B as the number of unique elements, are obtained for each combination of class and output pixel by the least squares method. Then, in step ST54, the coefficient data $k_1$ to $k_{10}$ thus obtained are stored in a memory. Then, the process is exited in step ST55.

Figure 11:
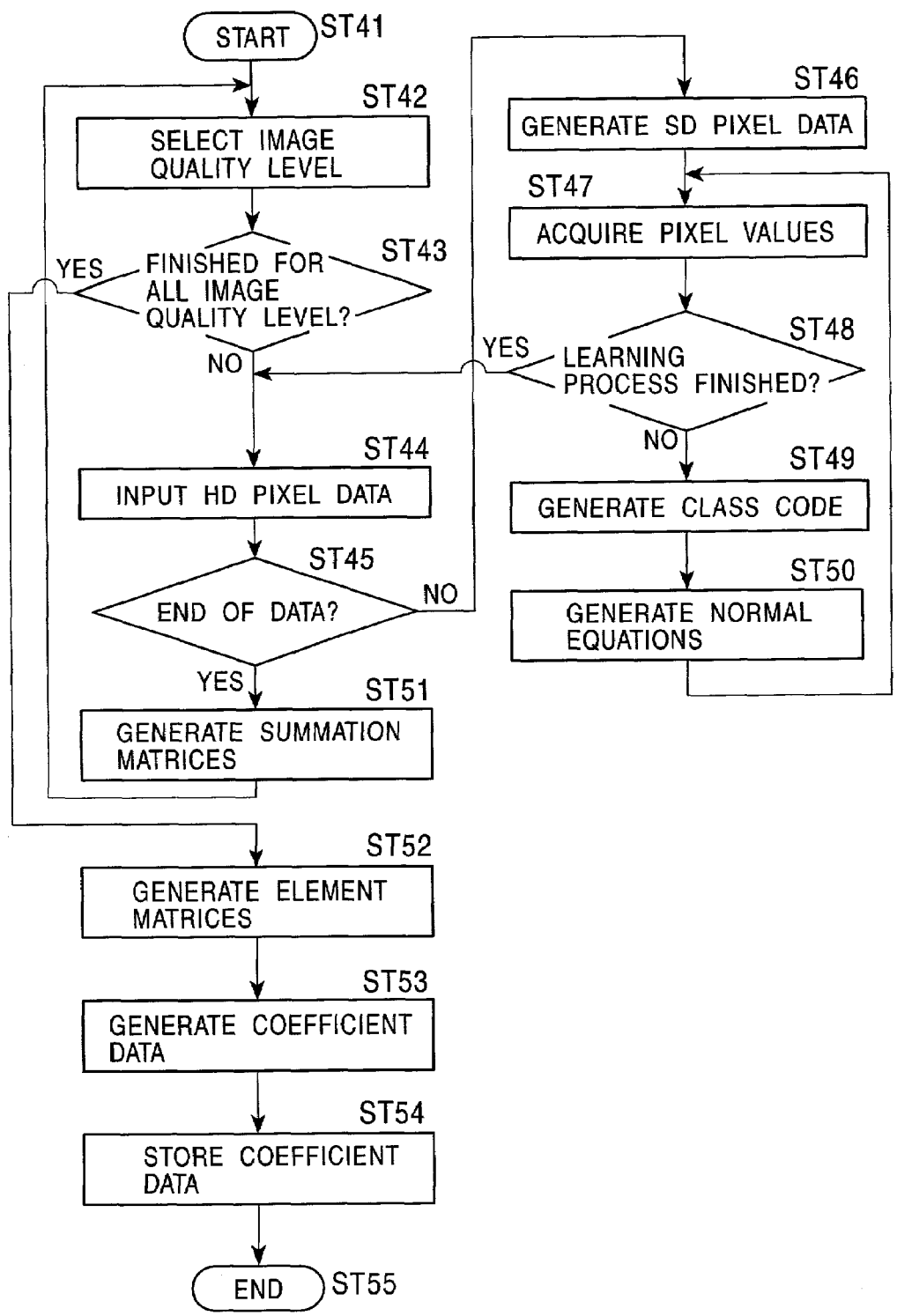
FIG. 11 is a flowchart showing a process for obtaining coefficient data.

As described above, by executing the process according to the flowchart shown in FIG. 11, coefficient data $k_1$ to $k_{10}$ to be stored in the information memory bank 135 in the image signal processing unit 110 in FIG. 1 are generated by the same method as for the data obtaining apparatus 150 shown in FIG. 8.

In the embodiment described above, coefficient data $k_1$ to $k_{10}$ for each class is stored in the information memory bank 135 in association with each of the output pixels ($HD_1$ to $HD_4$ and $HD_1'$ to $HD_4'$). By changing the phase of an output pixel relative to a pixel of an SD signal (525i signal), an HD signal other than 1050i signal can be generated in a similar manner.

Furthermore, in the embodiment described above, the generating equation, expressed in equation (15), for generating elements of a summation matrix A for obtaining coefficient data Wi for the estimate equation includes the parameters h and v defining the horizontal and vertical resolutions. The user is allowed to adjust the horizontal and vertical resolutions of an image based on an HD signal as desired by adjusting the values of the parameters h and v. Alternatively, the generating equation may include other types of parameters, for example, a parameter that defines the degree of noise suppression. Accordingly, the user is allowed to adjust, for example, the degree of noise suppression of an image based on an HD signal as desired.

Furthermore, the generating equation may include a parameter representing the phase of an output pixel with respect to the position of a pixel of an SD signal (525i signal). If the generating equation includes the parameter representing the phase of an output pixel, output video signals of various formats, or output video signals having different numbers of pixels, can be obtained from an SD signal (525i signal) by providing information regarding the phase of an output pixel. In that case, coefficient data for a generating equation, including the parameter representing the phase of an output signal, for generating elements of a summation matrix A for obtaining coefficient data Wi for the estimate equation is stored in the information memory bank 135 for each class.

The coefficient data to be stored in the information memory bank 135 may be acquired, for example, by changing the phases of pixels of an HD signal (teacher signal) and an SD signal (student signal) by an apparatus of the same construction as the coefficient data obtaining apparatus 150 shown in FIG. 8, generating a summation matrix A for obtaining coefficient data Wi for the estimate equation for each class in accordance with discrete values of a plurality of phases by the summation matrix generating unit 160, and otherwise the same as described above.

Furthermore, although equation (15) is used as a generating equation (approximate equation) for generating elements of a summation matrix for obtaining coefficient data Wi for the estimate equation, the present invention is not limited thereto. For example, a polynomial of an order different from that of equation (15), or an equation expressed as a different function may be used.

Furthermore, although classification is performed in the embodiment described above, the present invention may also be implemented without classification.

Furthermore, although a linear equation is used as an estimate equation for generating an HD signal in the embodiment described above, the present invention is not limited thereto. For example, an equation of higher degree may be used as an estimate equation.

Furthermore, although information signals are image signals in the embodiment described above, the present invention is not limited thereto. For example, the present invention may also be applied to a case where information signals are audio signals.

What is claimed is:

1. A coefficient data generating apparatus that is used, when converting a first information signal composed of a plurality of information data into a second information signal composed of a plurality of information data, for generating coefficient data for an estimate equation for calculating information data of a subject point associated with the second information signal from a plurality of information data extracted from the first information signal, said coefficient data generating apparatus comprising:

storage means for storing coefficient data for a generating equation, which includes a predetermined parameter, for generating elements of a plurality of summation matrices for obtaining coefficient data for the estimate equation;

parameter setting means for setting a value of the predetermined parameter;

matrix element generating means for generating the elements of the summation matrix by the generating equation based on the coefficient data stored in said storage means, in accordance with the value of the predetermined parameter set by said parameter setting means; and coefficient data generating means for generating coefficient data for the estimate equation using the plurality of summation matrices composed of the elements generated by said matrix element generating means, wherein each summation matrix is generated by using different parameter values, and said coefficient data in said storage means is obtained by using a plurality of first learning signals associated with said first information signal and a plurality of second learning signals associated with said second information signal and said coefficient data in said storage means is prepared with respect to each element of the plurality of summation matrices.

2. A coefficient data generating apparatus according to claim 1, wherein the predetermined parameter determines quality of an output obtained from the second information signal.

3. A coefficient data generating apparatus according to claim 1, wherein the predetermined parameter represents a phase of the subject point associated with the second information signal, with respect to the position of information data of the first information signal.

4. A coefficient data generating method that is used, when converting a first information signal composed of a plurality of information data into a second information signal composed of a plurality of information data, for generating coefficient data for an estimate equation for calculating information data of a subject point associated with the second information signal from a plurality of information data extracted from the first information signal, said coefficient data generating method comprising:

a first step of setting a value of a predetermined parameter;

a second step of generating elements of a plurality of summation matrices for obtaining coefficient data of the estimate equation, by a generating equation that includes the predetermined parameter, based on coefficient data of the generating equation and in accordance with the value of the predetermined parameter set in said first step;

a third step of generating coefficient data for the estimate equation using the plurality of summation matrices composed of the elements generated in said second step;

wherein each summation matrix is generated by using different parameter values; and a fourth step of obtaining the coefficient data by learning using a plurality of first learning signals associated with said first information signal and a plurality of second learning signals associated with said second information signal and said coefficient data is prepared with respect to each element of the plurality of summation matrices.

5. An information signal processing apparatus for converting a first information signal composed of a plurality of information data into a second information signal composed of a plurality of information data, said information signal apparatus comprising:

storage means for storing coefficient data for a generating equation, which includes a predetermined parameter, for generating elements of a plurality of summation matrices for obtaining coefficient data for an estimate equation;

parameter setting means for setting a value of the predetermined parameter;

coefficient data generating means for generating the elements of the plurality of summation matrices by the generating equation based on the coefficient data stored in said storage means and in accordance with the value of the predetermined parameter set by said parameter setting means, and for generating coefficient data for the estimate equation in accordance with the value of the predetermined parameter using a plurality of summation matrices composed of the elements;

wherein each summation matrix is generated by using different parameter values;

first data selecting means for selecting from the first information signal a plurality of first information data positioned around a subject point associated with the second information signal; and calculation means for calculating information data of the subject point using the estimate equation from the coefficient data for the estimate equation, generated by said coefficient data generating means, and from the plurality of information data selected by said first data selecting means, wherein said coefficient data in said storage means is obtained by using a plurality of first learning signals associated with said first information signal and a plurality of second learning signals associated with said second information signal and said coefficient data in said storage means is prepared with respect to each element of the plurality summation matrices.

6. An information signal processing apparatus according to claim 5, further comprising:

second data selecting means for selecting from the first information signal a plurality of second information data positioned around the subject point associated with the second information signal; and class detecting means for detecting a class to which the subject point belongs based on the plurality of second information data selected by said second data selecting means;

wherein said storage means stores the coefficient data for each class that can be detected by said class detecting means, and said coefficient data generating means generates coefficient data for the estimate equation in accordance with the class detected by said class detecting means and the value of the predetermined parameter set by said parameter setting means.

7. An information signal processing apparatus according to claim 6, wherein said coefficient data generating means comprises:

a matrix element generating unit for generating elements of the summation matrix for each class based on the coefficient data stored in said storage means;

a storage unit for storing the coefficient data for the estimate equation for each class, generated by said coefficient generating unit; and a coefficient data reading unit for reading coefficient data of the estimate equation, associated with the class detected by said class detecting means, from said storage unit and outputting the coefficient data that has been read.

8. An information signal processing apparatus according to claim 5, wherein the predetermined parameter determines quality of an output obtained from the second information signal.

9. An information signal processing apparatus according to claim 5, wherein the predetermined parameter represents a phase of the subject point associated with the second information signal, with respect to the position of information data of the first information signal.

10. An information signal processing method for converting a first information signal composed of a plurality of information data into a second information signal composed of a plurality of information data, said information signal method comprising:

a first step of setting a value of a predetermined parameter;

a second step of generating elements of a plurality of summation matrices for obtaining coefficient data of an estimate equation, by a generating equation that includes the predetermined parameter, based on coefficient data of the generating equation and in accordance with the value of the predetermined parameter set in said first step, and for generating coefficient data for the estimate equation in accordance with the value of the predetermined parameter using the plurality of summation matrices composed of the elements;

wherein each summation matrix is generated by using different parameter values;

a third step of selecting from the first information signal a plurality of first information data positioned around a subject point associated with the second information signal;

a fourth step of calculating information data of the subject point using the estimate equation from the coefficient data for the estimate equation, generated in said second step, and from the plurality of information data selected in said third step; and a fifth step of obtaining the coefficient data by learning using a plurality of first learning signals associated with said first information signal and a plurality of second learning signals associated with said second information signal and said coefficient data is prepared with respect to each element of the plurality of summation matrices.

11. A coefficient data obtaining apparatus for obtaining coefficient data for a generating equation, which includes a predetermined parameter, for generating elements of a plurality of summation matrices for obtaining coefficient data for an estimate equation that is used when converting a first information signal composed of a plurality of information data into a second information signal composed of a plurality of information data, said coefficient data obtaining apparatus comprising:
- data selecting means for selecting from a plurality of first learning signals associated with the first information signal a plurality of information data positioned around a subject point associated with a plurality of second learning signals associated with the second information signal;
- summation matrix generating means for generating a plurality of summation matrices for obtaining coefficient data for the estimate equation in accordance with a plurality of discrete values of the predetermined parameter based on the plurality of information data selected by said data selecting means and information data of the subject point associated with the second learning signal;
- wherein each summation matrix is generated by using different parameter values, and
- coefficient data generating means for generating coefficient data for a generating equation, which includes the predetermined parameter, for generating elements of the plurality of summation matrices, with respect to each element of the plurality of summation matrices, generated by said summation matrix generating means, respectively associated with the plurality of discrete values of the predetermined parameter.

12. A coefficient data obtaining apparatus according to claim 11, wherein the predetermined parameter determines quality of an output obtained from the second information signal.

13. A coefficient data obtaining apparatus according to claim 11, wherein the predetermined parameter represents a phase of the subject point associated with the second information signal, with respect to the position of information data of the first information signal.

14. A coefficient data obtaining method for obtaining coefficient data for a generating equation, which includes a predetermined parameter, for generating elements of a plurality of summation matrices for obtaining coefficient data for an estimate equation that is used when converting a first information signal composed of a plurality of information data into a second information signal composed of a plurality of information data, said coefficient data obtaining method comprising:
- a first step of selecting from a plurality of first learning signals associated with the first information signal a plurality of information data positioned around a subject point associated with a plurality of second learning signals associated with the second information signal;
- a second step of generating a plurality of summation matrices for obtaining coefficient data for the estimate equation in accordance with a plurality of discrete values of the predetermined parameter based on the plurality of information data selected in said first step and information data of the subject point associated with the second learning signal;
- wherein each summation matrix is generated by using different parameter values, and
- a third step of generating coefficient data for a generating equation, which includes the predetermined parameter, for generating elements of the plurality of summation matrices, with respect to each element of the plurality of summation matrices, generated in said second step, respectively associated with the plurality of discrete values of the predetermined parameter.

* * * * *